US008898575B2

(12) United States Patent  
Jain et al.

(10) Patent No.: US 8,898,575 B2
(45) Date of Patent: Nov. 25, 2014

(54) INDICATING UNAVAILABILITY OF AN UPLOADED VIDEO FILE THAT IS BEING BITRATE ENCODED

(75) Inventors: Priyanka Jain, Mountain View, CA (US); Durgadatt R. Kamath, Cupertino, CA (US); Kishore Nair, Fremont, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1151 days.

(21) Appl. No.: 12/552,364

(22) Filed: Sep. 2, 2009

(65) Prior Publication Data

US 2011/0055721 A1    Mar. 3, 2011

(51) Int. Cl.
G06F 3/00 (2006.01)
G06Q 30/02 (2012.01)
H04N 21/2225 (2011.01)

(52) U.S. Cl.
CPC ............ G06Q 30/02 (2013.01); H04N 21/2225 (2013.01)
USPC ............................. 715/748; 715/736; 715/821

(58) Field of Classification Search
CPC .................................................. H04N 21/2225
USPC ........................................... 715/736, 748, 821
See application file for complete search history.

(56) References Cited

U.S. PATENT DOCUMENTS

| | | | | |
|---|---|---|---|---|
| 5,649,214 A * | 7/1997 | Bruso et al. | ................ | 704/8 |
| 6,226,618 B1 * | 5/2001 | Downs et al. | ................ | 705/51 |
| 6,389,538 B1 * | 5/2002 | Gruse et al. | ................ | 713/194 |
| 7,379,965 B2 * | 5/2008 | Sherwood et al. | ............ | 709/203 |
| 7,555,719 B1 * | 6/2009 | Yehuda et al. | ................ | 715/736 |
| 8,180,920 B2 * | 5/2012 | Mills et al. | ................ | 709/238 |
| 2001/0025308 A1 * | 9/2001 | Jinushi et al. | ................ | 709/219 |
| 2004/0210930 A1 * | 10/2004 | Cullinan et al. | ................ | 725/37 |
| 2005/0055646 A1 * | 3/2005 | Melzer | ................ | 715/804 |
| 2006/0265477 A1 * | 11/2006 | Bartholomew | ................ | 709/219 |
| 2007/0112935 A1 * | 5/2007 | Espelien | ................ | 709/217 |
| 2007/0162487 A1 * | 7/2007 | Frailey | ................ | 707/102 |
| 2008/0120555 A1 * | 5/2008 | McMahan et al. | ................ | 715/748 |
| 2008/0201642 A1 * | 8/2008 | Chong et al. | ................ | 715/736 |
| 2008/0207182 A1 * | 8/2008 | Maharajh et al. | ................ | 455/414.1 |
| 2008/0235600 A1 * | 9/2008 | Harper et al. | ................ | 715/748 |
| 2009/0024922 A1 * | 1/2009 | Markowitz et al. | ................ | 715/716 |
| 2009/0178005 A1 * | 7/2009 | Jheng | ................ | 715/825 |
| 2009/0249222 A1 * | 10/2009 | Schmidt et al. | ................ | 715/751 |
| 2009/0276715 A1 * | 11/2009 | Arbogast et al. | ................ | 715/736 |
| 2010/0158109 A1 * | 6/2010 | Dahlby et al. | ................ | 375/240.03 |
| 2010/0175010 A1 * | 7/2010 | Jeyabalan et al. | ................ | 715/769 |
| 2010/0281394 A1 * | 11/2010 | Gopi et al. | ................ | 715/748 |
| 2011/0060994 A1 * | 3/2011 | Maxwell et al. | ................ | 715/730 |

* cited by examiner

Primary Examiner — William Titcomb
(74) Attorney, Agent, or Firm — Brinks Gilson & Lione

(57) ABSTRACT

Techniques are described herein for indicating unavailability of an uploaded video file that is being bitrate encoded. For instance, upon a determination that the uploaded video file is being bitrate encoded, a graphical user interface may be provided that includes an interface element indicating that the uploaded video file is unavailable for processing except for the bitrate encoding. The interface element may be an icon, a textual message, or any other suitable interface element that is capable of indicating that the uploaded video file that is being bitrate encoded is unavailable. When the bitrate encoding is completed, the interface element may be automatically updated to indicate that the uploaded video file is available for processing.

20 Claims, 16 Drawing Sheets

INDICATING UNAVAILABILITY OF AN UPLOADED VIDEO FILE THAT IS BEING BITRATE ENCODED

BACKGROUND OF THE INVENTION

1. Field of the Invention

The present invention generally relates to techniques for indicating unavailability of a file.

2. Background

Video content is a sequence of still images that is capable of representing motion with respect to objects that are depicted in the still images. Video content may be provided to users in a computer system in any of a variety of situations. For example, a user may select video content for viewing from an online service, such as iTunes®, YouTube®, Yahoo!® Video, MSN® Video, etc. In another example, video content may be provided to a user as an online advertisement when the user accesses a Web site with which the online advertisement is associated. In accordance with this example, a publisher who provides the Web site may serve the online advertisement along with other online content associated with the Web site to the user.

A provider of video content may upload a video file that includes the video content to a server. For instance, the server may be provided in a networked environment, such as the Internet. An uploaded video file often is encoded into a designated format (e.g., bitrate encoded) before the video content that is included in the video file may be provided to users in the computer system. The encoding of a video file may take a relatively long time (e.g., multiple minutes) depending on the size of the video file.

The provider may wish to view a list of video files that are uploaded to the server. For instance, a graphical user interface may be provided to the provider to enable the provider to view the list of video files. Such a list often includes uploaded video files that are being encoded, even though such files typically are not available for processing until encoding is completed. Accordingly, including the uploaded video files that are being encoded in the list may inaccurately suggest that those files are available for processing other than the encoding.

Thus, systems, methods, and computer program products are needed that are capable of indicating unavailability of an uploaded video file that is being encoded.

BRIEF SUMMARY OF THE INVENTION

Various approaches are described herein for, among other things, indicating unavailability of an uploaded video file that is being bitrate encoded. For instance, upon a determination that the uploaded video file is being bitrate encoded, a graphical user interface may be provided that includes an interface element indicating that the uploaded video file is unavailable for processing except for the bitrate encoding. The interface element may be an icon, a textual message, or any other suitable interface element that is capable of indicating that the uploaded video file that is being bitrate encoded is unavailable. When the bitrate encoding is completed, the interface element may be automatically updated to indicate that the uploaded video file is available for processing.

A determination may be made that a cursor is placed within a threshold proximity of a representation of an uploaded video file that is being bitrate encoded. For instance, the representation of the uploaded video file may be provided in a graphical user interface in which a user may move the cursor using an input device, such as a keyboard, pointing device, etc. Upon determination that the cursor is within the threshold proximity, an interface element (e.g., a textual message) may be provided in the graphical user interface to indicate that the uploaded video file is unavailable for processing except for the bitrate encoding.

Menu option(s) associated with an uploaded video file may be disabled upon a determination that the uploaded video file is being bitrate encoded. Example menu operations include but are not limited to copying the uploaded video file, deleting the uploaded video file, moving the uploaded video file, previewing the uploaded video file, assigning the uploaded video file to an ad group, etc. The menu options may be listed in a graphical user interface that is accessible to a user, for example. When the bitrate encoding is completed, the menu option(s) associated with the uploaded video file may be automatically enabled.

An example method is described in which an indicator is received that specifies performance of bitrate encoding processing with respect to an uploaded video file. Upon receiving the indicator, a graphical user interface is provided that includes an interface element associated with the uploaded video file. The interface element indicates that the uploaded video file is unavailable for processing except for the bitrate encoding processing.

An example system is also described herein. The example system includes a determination module and a GUI module. The determination module is configured to determine that bitrate encoding processing is being performed with respect to an uploaded video file. The GUI module is configured to provide a graphical user interface that includes an interface element associated with the uploaded video file. The interface element indicates that the uploaded video file is unavailable for processing except for the bitrate encoding processing in response to determination that the bitrate encoding processing is being performed with respect to the uploaded video file.

A computer program product is also described herein. The computer program product includes a computer-readable medium having computer program logic recorded thereon for enabling a processor-based system to indicate unavailability of an uploaded video file that is being bitrate encoded. The computer program logic includes a first program logic module and a second program logic module. The first program logic module is for enabling the processor-based system to determine that bitrate encoding processing is being performed with respect to an uploaded video file. The second program logic module is for enabling the processor-based system to provide a graphical user interface that includes an interface element associated with the uploaded video file. The interface element indicates that the uploaded video file is unavailable for processing except for the bitrate encoding processing in response to determination that the bitrate encoding processing is being performed with respect to the uploaded video file.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles involved and to enable a person skilled in the relevant art(s) to make and use the disclosed technologies.

Figure 1:
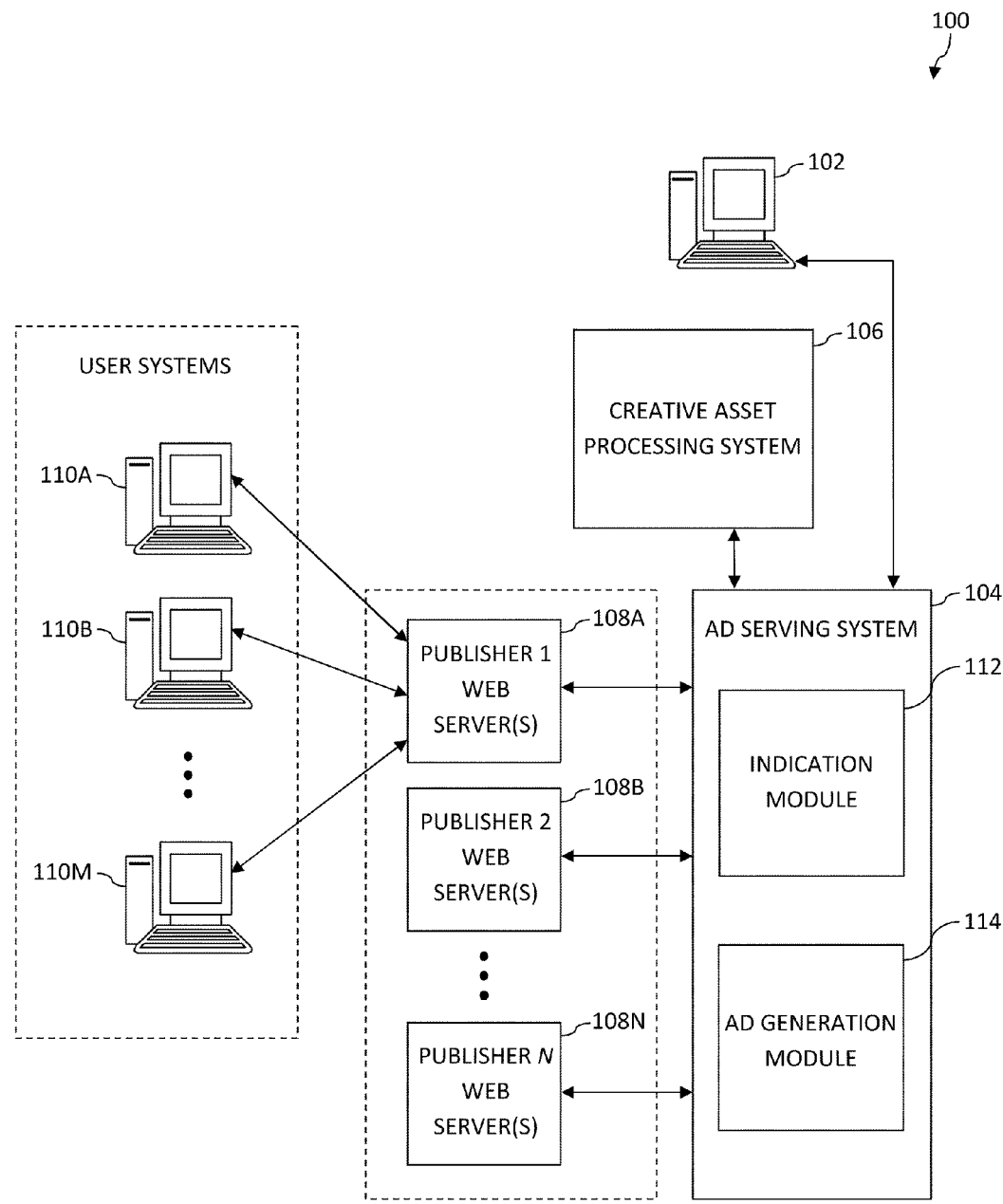
FIG. 1 is a block diagram of an example online advertisement ("ad") network in accordance with an embodiment described herein.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

The detailed description begins with an introductory section to introduce some of the concepts that will be discussed in further detail in subsequent sections. Example embodiments for indicating unavailability of a file are then discussed. An example implementation of an online advertisement ("ad") network is described to provide an example context in which example embodiments may be implemented, though it will be recognized that the scope of the example embodiments is not limited to an online ad network. An example computer implementation is then described, followed by a conclusion section.

I. INTRODUCTION

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention. For instance, although the embodiments described herein refer specifically, and by way of example, to online advertisement ("ad") networks, it will be readily apparent to persons skilled in the relevant art(s) that embodiments are equally applicable to other types of networks and/or systems.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

Example embodiments are capable of indicating that an uploaded video file is unavailable for processing when the uploaded video file is being bitrate encoded. For example, the uploaded video file may not be served to a user, included in an online advertisement, etc. For instance, upon a determination that the uploaded video file is being bitrate encoded, a graphical user interface may be provided that includes an interface element indicating that the uploaded video file is unavailable for processing except for the bitrate encoding. The interface element may be an icon, a textual message, or any other suitable interface element that is capable of indicating that the uploaded video file that is being bitrate encoded is unavailable. When the bitrate encoding is completed, some example embodiments automatically update the interface element to indicate that the uploaded video file is available for processing.

Some example embodiments are capable of determining when a cursor is placed within a threshold proximity of a representation of an uploaded video file that is being bitrate encoded. For instance, the representation of the uploaded video file may be provided in a graphical user interface in which a user may move the cursor using an input device, such as a keyboard, pointing device, etc. When the cursor is within the threshold proximity, an interface element may be provided in the graphical user interface to indicate that the uploaded video file is unavailable for processing except for the bitrate encoding. The interface element may be an icon, a textual message, or any other suitable interface element that is capable of indicating that the uploaded video file that is being bitrate encoded is unavailable.

Some example embodiments are capable of disabling menu option(s) associated with an uploaded video file upon a determination that the uploaded video file is being bitrate encoded. Example menu operations include but are not limited to copying the uploaded video file, deleting the uploaded video file, moving the uploaded video file, previewing the uploaded video file, assigning the uploaded video file to an ad group, etc. The menu options may be listed in a graphical user interface that is accessible to a user, for example. When the bitrate encoding is completed, some example embodiments automatically enable the menu option(s) associated with the uploaded video file.

II. EXAMPLE EMBODIMENTS FOR INDICATING UNAVAILABILITY OF A FILE

FIG. 1 is a block diagram of an example online ad network 100 in accordance with an embodiment described herein. Generally speaking, online ad network 100 operates to serve online ads provided by advertisers to Web sites published by publishers when such Web sites are accessed by certain users of the network, thereby delivering the online ads to the users. As shown in FIG. 1, online ad network 100 includes at least one advertiser system 102, an ad serving system 104, a creative asset processing system 106, a plurality of publisher Web servers 108A-108N, and a plurality of user systems 110A-110M.

Each of publisher Web servers 108A-108N is a computer or other processing system that includes one or more processors configured to host a Web site published by a corresponding publisher 1-N so that such Web site is accessible to users of network 100. A user may access such Web sites using a client (e.g., a Web browser) installed on a system owned by or otherwise accessible to the user. By way of example, FIG. 1 shows a plurality of user systems 110A-110M. Each of user systems 110A-110M is a computer or other processing system including one or more processors configured to execute a client that enables a user to visit any of the Web sites hosted by publisher Web servers 108A-108N.

As depicted in FIG. 1, each of client systems 110A-110M is communicatively connected to publisher 1 Web server(s) 108A for the purpose of accessing a Web site published by publisher 1. Persons skilled in the relevant art(s) will recognize that each of user systems 110A-110M is capable of connecting to any of publisher Web servers 108A-108N to access the Web sites hosted thereon. Communication between user systems 110A-110M and publisher Web servers 108A-108N is carried out over a wide area network, such as the Internet, using well-known network communication protocols. Additionally or alternatively, the communication may be carried out over a local area network (LAN) or another type of network.

Advertiser system 102 is a computer or other processing system that includes one or more processors configured to upload online ads and/or creative assets to ad serving system 104. Examples of creative assets include but are not limited to video files, audio files, image files, etc. Techniques for uploading online ads and/or creative assets are described below with reference to FIGS. 4-8.

Ad serving system 104 is a computer or other processing system including one or more processors configured to deliver online ads to each of publisher Web servers 108A-108N when the Web sites hosted by such Web servers are accessed by certain users, thereby facilitating the delivery of such online ads to the users. For example, ad serving system 104 may receive the online ads from an advertiser system 102. In another example, ad generation module 114 of ad serving system 104 may generate the online ads based on one or more creative assets received from the advertiser system 102.

Certain creative assets that are uploaded to ad serving system 104 by advertiser system 102 are processed before those creative assets can be included in online ads generated by ad generation module 114 of ad serving system 104. Creative asset processing system 106 is configured to process such creative assets received from advertiser system 102, so that those creative assets may be included in online ads. In one example implementation, creative asset processing system 106 encodes (e.g., bitrate encodes) video files into a designated format. For instance, ad serving system 104 may be configured to serve the video files in accordance with only the designated format, though the scope of example embodiments is not limited in this respect.

In accordance with this example implementation, an advertiser or representative thereof who uploads a video file may view the uploaded video file along with other uploaded creative assets using a graphical user interface that is supported by a client (e.g., a Web browser) installed on advertiser system 102, for example. The advertiser or representative thereof who uploads a video file may wish to determine whether the uploaded video file is being encoded. For instance, the uploaded video file may not be available for other types of processing while the uploaded video file is being encoded. Accordingly, indication module 112 of ad serving system 104 is configured to determine whether the uploaded video file is being encoded. Indication module 112 is further configured to indicate that the uploaded video file is unavailable for processing (except for the encoding) in response to determining that the uploaded video file is being encoded. Techniques for indicating that an uploaded video file is unavailable for processing (except for the encoding) are discussed in further detail below with reference to FIGS. 2A, 2B, 3, and 9-12.

In further accordance with this example implementation, creative asset processing system 106 may be configured to generate a plurality of encoded files corresponding to respective bitrates, based on the uploaded video file. For instance, an advertiser or representative thereof may upload the video file having any of a variety of initial formats, such as Windows Media Video (WMV) format developed by Microsoft Corporation, QuickTime® format developed by Apple Inc., Audio Video Interleave (AVI) format developed by Microsoft Corporation, Motion Picture Experts Group (MPEG) format developed by the Motion Picture Experts Group, Graphics Interchange Format (GIF) developed by CompuServe Interactive Services, Inc. Flash Video (FLV) format originally developed by Macromedia (now Adobe Systems, Inc.), Shockwave Flash (SWF) format originally developed by FutureWave Software (now Adobe Systems, Inc.), ZIP format developed by Phil Katz, etc. using advertiser system 102. Creative asset processing system 106 is capable of encoding a video file having any of the initial formats to generate the plurality of encoded files having the designated format.

The bitrates associated with the encoded files correspond to respective bandwidths that may be available for delivering online ads that include the encoded files. For instance, creative asset processing system 106 may be configured to generate five encoded files based on the video file. Four of the five encoded files may correspond to bitrates of 100 kilobits per second (Kbps), 300 Kbps, 700 Kbps, and 1000 Kbps, respectively. These example bitrates are provided for illustrative purposes and are not intended to be limiting. The fifth encoded file may include a thumbnail view of an image associated with the video file. For example, the thumbnail view may be a frame of the video associated with the video file to serve as a preview of the video.

The advertiser or representative thereof who uploaded the video file may access the encoded files associated with the video file using a client (e.g., a Web browser) installed on advertiser system 102, for example. The advertiser may select among the encoded files for inclusion in an online ad. The client may list uniform reference identifiers (URIs) associated with the respective encoded files, which the advertiser may copy and paste into the online ad, for example. The URIs may be uniform resource locators (URLs), uniform resource names (URNs), or other suitable identifiers. An example Web page via which an advertiser or representative thereof may access such encoded files is described below with reference to FIG. 14.

Creative asset processing system 106 may utilize any of a variety of encoding platforms and/or techniques to encode a video file. For instance, creative asset processing system 106 may use open source software, such as FFmpeg (developed by Fabrice Bellard and maintained by Michael Niedermayer) or MPlayer (developed by Arpad Gereoffy and maintained by Alex Beregszaszi); On2 Flix Engine developed by On2 Technologies Inc.; Carbon Coder/Carbon Server developed by Rhozet, which is a business unit of Harmonic, Inc.; a proprietary encoding technique, etc.

The functionality of creative asset processing system 106 is described herein with continued reference to the example implementation mentioned above, in which video files are encoded into a designated format. It will be recognized, however, that the embodiments described herein are applicable to implementations that are configured to perform any of a variety of processes with respect to any suitable type of creative asset.

Communication among advertiser system 102, ad serving system 104, and creative asset processing system 106 is carried out over a wide area network, such as the Internet, using well-known network communication protocols. Additionally or alternatively, the communication may be carried out over a local area network (LAN) or another type of network. Although one advertiser system 102 is depicted in FIG. 1, persons skilled in the relevant art(s) will recognize that any number of advertiser systems may be communicatively coupled to ad serving system 104. For instance, the functionality of ad serving system 104 may be accessible to one or more advertisers or representatives thereof via respective advertiser systems.

Although advertiser system 102 and user systems 110A-110M are depicted as desktop computers in FIG. 1, persons skilled in the relevant art(s) will appreciate that advertiser system 102 and user systems 110A-110M may include any client-enabled system or device, including but not limited to a laptop computer, a personal digital assistant, a cellular telephone, or the like.

Figure 2A:
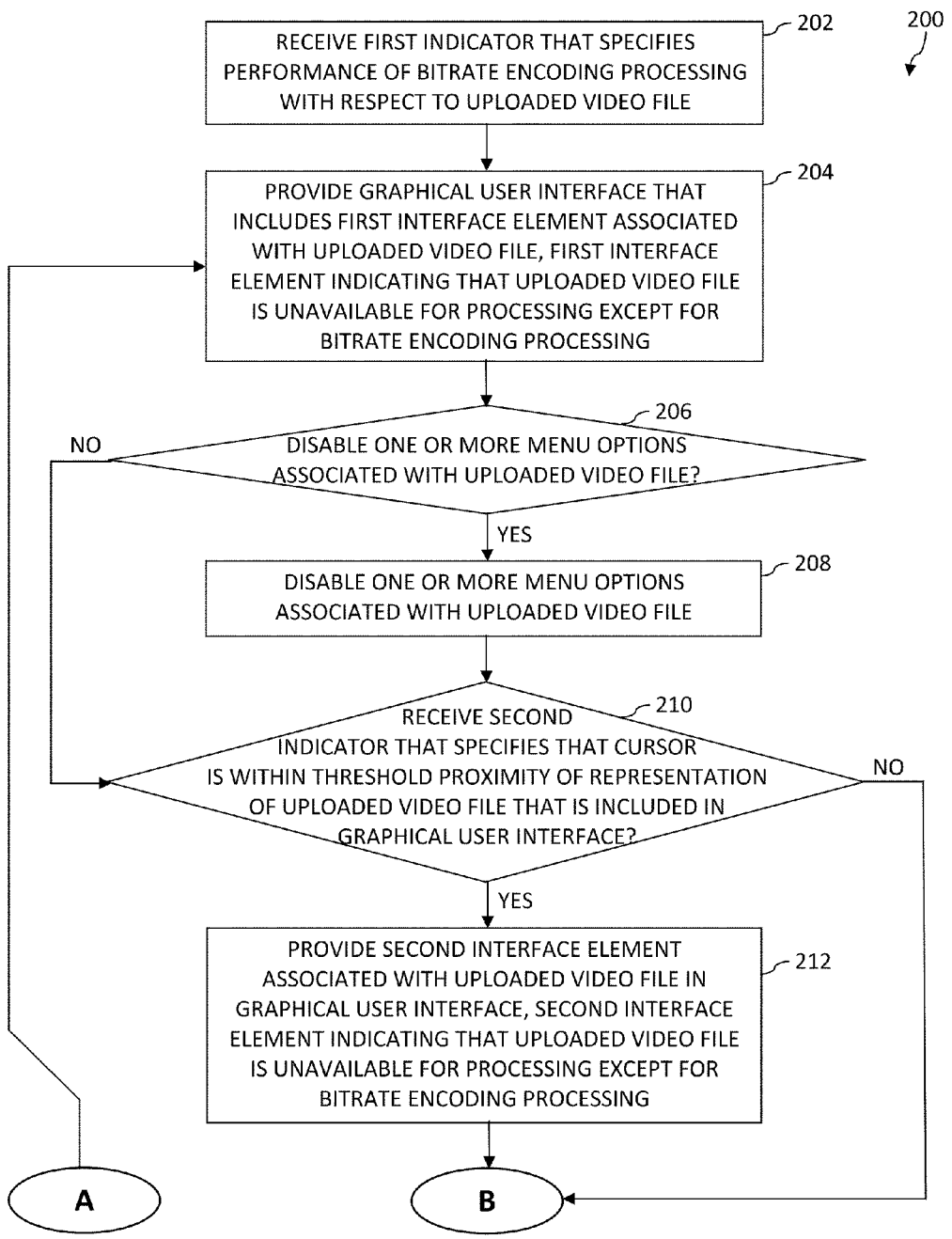
FIGS. 2A and 2B depict respective portions of a flowchart of a method for indicating unavailability of an uploaded video file that is being bitrate encoded in accordance with an embodiment described herein.
Figure 2B:
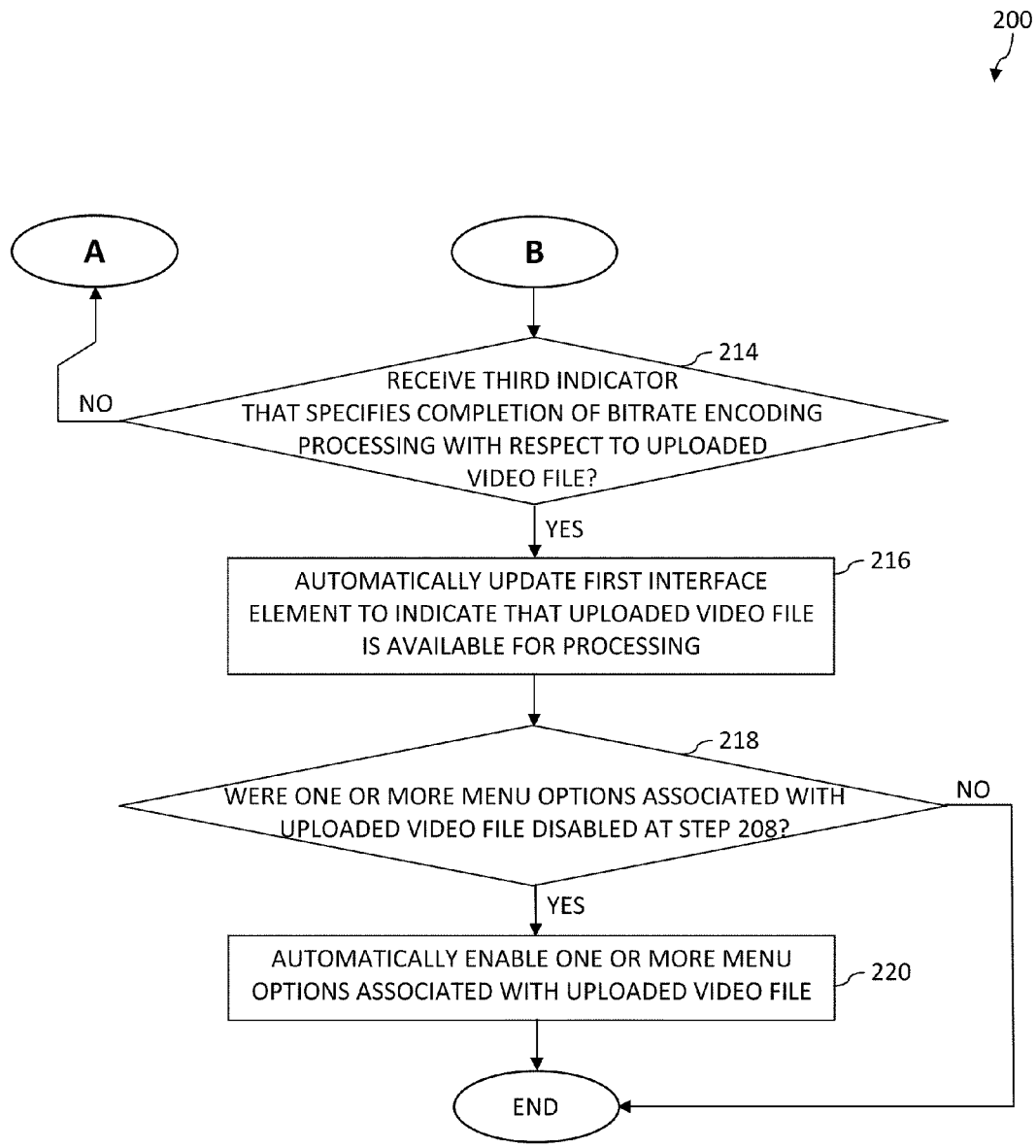

FIGS. 2A and 2B depict respective portions of a flowchart 200 of a method for indicating unavailability of an uploaded video file that is being bitrate encoded in accordance with an embodiment. Flowchart 200 may be performed by indication module 112 of ad serving system 104 shown in FIG. 1, for example. For illustrative purposes, flowchart 200 is described with respect to an indication module 112' shown in FIG. 3, which is an example of an indication module 112, according to an embodiment. In this document, whenever a prime is used to modify a reference number, the modified reference number indicates an example (or alternate) implementation of the element that corresponds to the reference number.

Figure 3:
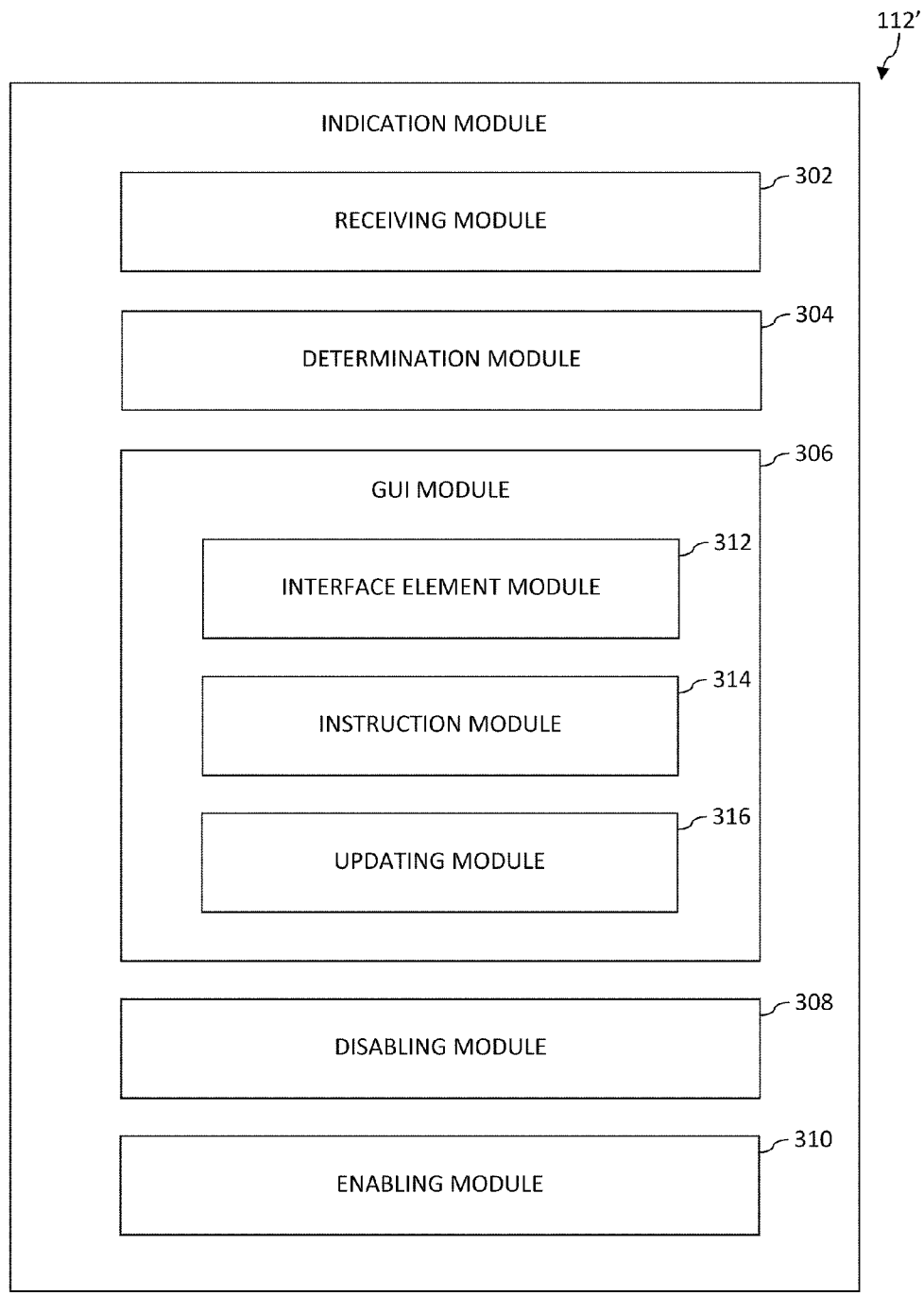
FIG. 3 is a block diagram of an example implementation of an indication module shown in FIG. 1 in accordance with an embodiment described herein.

As shown in FIG. 3, indication module 112' includes a receiving module 302, a determination module 304, a graphical user interface (GUI) module 306, a disabling module 308, and an enabling module 310. GUI module 306 includes an interface element module 312, an instruction module 314, and an updating module 316. Further structural and operational embodiments will be apparent to persons skilled in the relevant art(s) based on the discussion regarding flowchart 200. Flowchart 200 is described as follows.

As shown in FIG. 2A, the method of flowchart 200 begins at step 202. In step 202, a first indicator is received that specifies performance of bitrate encoding processing with respect to an uploaded video file. The first indicator may be received from creative asset processing system 106 of FIG. 1, though the scope of the example embodiments is not limited in this respect. For instance, the bitrate encoding processing may generate a plurality of encoded files corresponding to a plurality of respective bitrates based on the uploaded video file. In an example implementation, receiving module 302 receives the first indicator.

At step 204, a graphical user interface is provided that includes a first interface element associated with the uploaded video file. The first interface element indicates that the uploaded video file is unavailable for processing except for the bitrate encoding processing. For example, the first interface element may include an icon, a textual message, or any other suitable interface element that is capable of indicating that the uploaded video file is unavailable for processing except for the bitrate encoding processing. In another example, the first interface element may include a textual message that indicates that the bitrate encoding processing is being performed with respect to the uploaded video file.

In yet another example, the graphical user interface may provide instructions that enable a user to determine whether the bitrate encoding processing is completed with respect to the uploaded video file. For instance, the graphical user interface may include a textual message that instructs a user (e.g., an advertiser or representative thereof) to refresh a client window (e.g., a Web browser window) to check the status of the bitrate encoding processing. In an example implementation, instruction module 314 provides the instructions to be included in the graphical user interface. For instance, instruction module 314 may retrieve the instructions from a database or other memory storage.

In an example implementation, GUI module 306 provides the graphical user interface. In accordance with this example implementation, interface element module 312 may provide the first interface element to be included in the graphical user interface. For instance, interface element module 312 may generate the first interface element. Example Web pages showing some example first interface elements, which indicate that respective uploaded video files are unavailable for processing except for bitrate encoding processing, are described below with reference to FIGS. 9-12.

At step 206, a determination is made whether one or more menu options associated with the uploaded video file are to be disabled. Example menu operations include but are not limited to copying the uploaded video file, deleting the uploaded video file, moving the uploaded video file, previewing the uploaded video file, assigning the uploaded video file to an ad group, etc. For instance, the menu options may be listed in a graphical user interface that is accessible to the user. An example Web page showing some example menu options is described below with reference to FIG. 11. In an example implementation, determination module 304 determines whether the one or more menu options associated with the uploaded video file are to be disabled. If the one or more menu options are to be disabled, flow continues to step 208. Otherwise, flow continues to step 210.

At step 208, the one or more menu options associated with the uploaded video file are disabled. In an example implementation, disabling module 308 disables the one or more menu options.

At step 210, a determination is made whether a second indicator is received that specifies that a cursor is within a threshold proximity of a representation of the uploaded video file that is included in the graphical user interface. The second indicator may be received from creative asset processing system 106 of FIG. 1, though the scope of the example embodiments is not limited in this respect. The representation of the uploaded video file may include a textual representation of the uploaded video file (e.g., a name and/or some other attribute of the uploaded video file) and/or a graphical representation of the uploaded video file (e.g., an icon that represents the uploaded video file). For instance, the second indicator may specify that the cursor is hovering over at least one pixel that constitutes the representation of the uploaded video file, within a designated number of pixels to the perimeter of the representation, etc. In an example implementation, determination module 304 determines whether the second indicator is received. If the second indicator is received, flow continues to step 212. If the second indicator is not received, however, flow continues to step 214, which is shown in FIG. 2B.

At step 212, a second interface element associated with the uploaded video file is provided in the graphical user interface. The second interface element indicates that the uploaded video file is unavailable for processing except for the bitrate encoding processing. For example, the second interface element may include an icon, a textual message, or any other suitable interface element that is capable of indicating that the uploaded video file is unavailable for processing except for the bitrate encoding processing. The second interface element may include a textual message that indicates that the bitrate encoding processing is being performed with respect to the uploaded video file. The second interface may be provided for a predetermined duration, while the cursor is within the threshold proximity of the representation of the uploaded video file, for a time period that includes a designated period of time after the cursor is removed from the threshold proximity of the representation of the uploaded video file, until completion of the bitrate encoding processing, or any other suitable duration. In an example implementation, interface element module 312 provides the second interface element.

At step 214, a determination is made whether a third indicator is received that specifies completion of the bitrate encoding processing with respect to the uploaded video file. The third indicator may be received from creative asset processing system 106 of FIG. 1, though the scope of the example embodiments is not limited in this respect. In an example implementation, determination module 304 determines whether the third indicator is received. If the third indicator is received, flow continues to step 216. If the third indicator is not received, however, flow returns to step 204, which is shown in FIG. 2A.

At step 216, the first interface element is automatically updated to indicate that the uploaded video file is available for processing. In an example implementation, updating module 316 automatically updates the first interface element to indicate that the uploaded video file is available for processing.

At step 218, a determination is made whether the one or more menu options associated with the uploaded video file were disabled at step 208. In an example implementation, determination module 304 determines whether the one or more menu options associated with the uploaded video file were disabled at step 208. If the one or more menu options were disabled at step 208, flow continues to step 220. Otherwise, flowchart 200 ends.

At step 220, the one or more menu options associated with the uploaded video file are automatically enabled. In an example implementation, enabling module 310 automatically enables the one or more menu options associated with the uploaded video file.

In some example embodiments, one or more steps 202, 204, 206, 208, 210, 212, 214, 216, 218, and/or 220 of flowchart 200 may not be performed. Moreover, steps in addition to or in lieu of steps 202, 204, 206, 208, 210, 212, 214, 216, 218, and/or 220 may be performed.

It will be recognized that indication module 112' may not include one or more of receiving module 302, determination module 304, GUI module 306, disabling module 308, enabling module 310, interface element module 312, instruction module 314, and/or updating module 316. Furthermore, indication module 112' may include modules in addition to or in lieu of receiving module 302, determination module 304, GUI module 306, disabling module 308, enabling module 310, interface element module 312, instruction module 314, and/or updating module 316.

A. Example Web Pages for Uploading a Video File

Figure 4:
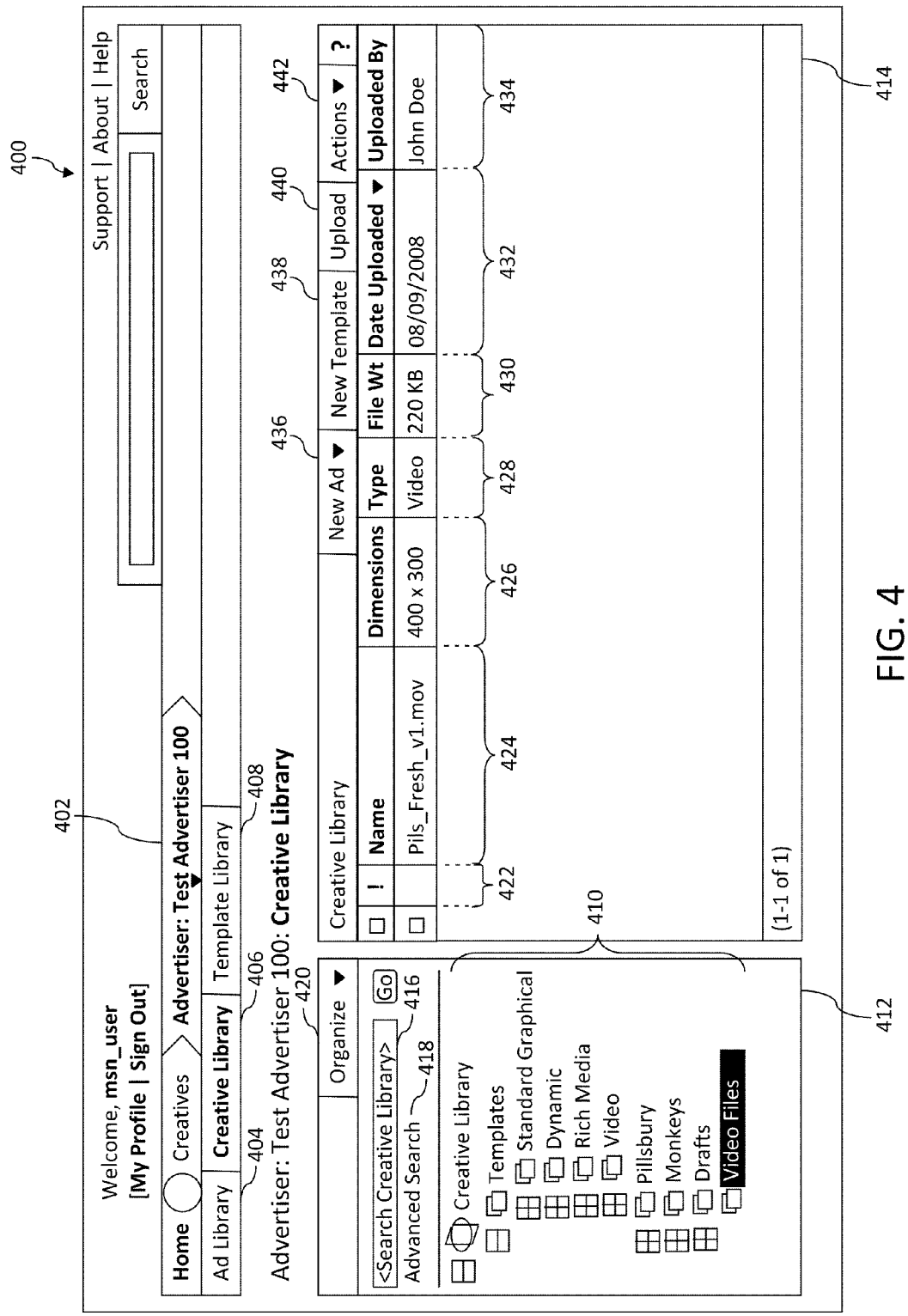
FIG. 4 is an illustration of an example Web page showing a graphical interface element for displaying creative assets that are included in a creative library in accordance with an embodiment described herein.

Some example Web pages that may be used to upload a video file to a computer system (e.g., ad serving system 104) are discussed below with reference to FIGS. 4-8. FIG. 4 is an illustration of an example Web page 400 showing a graphical user interface for providing representations of creative assets that are included in a creative library in accordance with an embodiment described herein. A creative library is a collection of creative assets. For instance, the creative library may be a hierarchical folder structure that includes the creative assets. As shown in FIG. 4, a user designated as "msn_user" is logged into a computer system that provides access to content (e.g., online ads and/or creative assets). For example, ad serving system 104 of FIG. 1 may be configured to provide access to the content. The user is authorized to access content for any provider listed in provider list drop down menu 402. The content for a selected provider is accessible via Ad Library 404 and Creative Library 406. Ad Library 404 includes online ads of the selected provider, and Creative Library 406 includes creative assets of the selected provider. Template Library 408 includes templates for creating an online ad. A template is a predefined process that enables a user to generate an online ad within a given framework more efficiently than generating the ad free-form. For example, the user can utilize the template to generate an online ad having a specified size, file weight, format, etc. One or more creative assets stored in Creative Library 406 may be combined with a template stored in Template Library 408 to generate an online ad. For instance, ad generation module 114 of FIG. 1 may generate the online ad.

In FIG. 4, Creative Library 406 of the provider "Test Advertiser 100" is selected, causing a hierarchical listing 410 of the folders designated for storing creative assets of Test Advertiser 100 to appear in window 412. When a folder in window 412 is selected, the creative assets that are stored in that folder appear in window 414. For example, sub-folder "Video Files" is selected in window 412, and the only creative asset stored in the Video Files sub-folder (i.e., the creative asset named "Pils_Fresh_v1.mov") appears in window 414. The hierarchical listing 410 of folders in window 412 is searchable by using search tool 416. Advanced Search tool 418 enables a user to search the hierarchical listing 410 of folders by specifying a name and/or one or more attributes of the sought folder(s), thereby filtering the hierarchical listing 410.

Organize drop down menu 420 enables a user to perform operations on folders of hierarchical folder structure 410. Examples of operations that may be performed on folders of hierarchical folder structure 410 include but are not limited to creating a new folder within hierarchical folder structure 410, cut a folder from hierarchical folder structure 410, copy a folder from a first folder to a second folder within hierarchical folder structure 410, paste a folder in hierarchical folder structure 410, move a folder from a first folder to a second folder within hierarchical folder structure 410, rename a folder in hierarchical folder structure 410, delete a folder from hierarchical folder structure 410, etc.

When the name of a creative asset is listed in window 414, indicators associated with that creative asset are listed as well. As shown in FIG. 4, an encoding status for each creative asset is provided in column 422. For instance, the encoding status may indicate that encoding of the creative asset has not yet begun, that encoding is being performed with respect to the creative asset, that an error occurred during encoding of the creative asset, that encoding of the creative asset is completed, etc. Further discussion of encoding status is provided below with reference to FIGS. 9-12.

The name of each creative asset is listed in column 424. In column 426, a dimensions indicator specifies the dimensions of the creative asset. The creative asset may be any of a variety of types, including but not limited to audio, image, video, etc. For instance, the creative asset named "Pils_Fresh_v1.mov" is listed as being a video type creative asset in column 428. In column 430, a file weight indicator specifies a bit size of the creative asset. For instance, the creative asset named "Pils_Fresh_V2.mov" is shown to have a file weight of 220 kilobytes (KB) for illustrative purposes. The date that the creative asset was uploaded to the computer system is specified in column 432. The name of the individual who uploaded the creative asset is provided in column 434.

New Ad drop down menu 436 enables a user to generate a new online ad by selecting a stored ad from Ad Library 404, a creative from Creative Library 406, or a template from Template Library 408. The user can then modify the selected ad, creative, or template to generate the new ad. New Template button 438 enables the user to generate a new ad template.

Upload button 440 enables the user to upload a creative asset to the computer system that stores Creative Library 406 or to some other computer system designated to receive the uploaded creative asset.

Actions drop down menu 442 enables a user to perform menu operations with respect to creative assets stored in Creative Library 406. Actions drop down menu 442 and menu operations are discussed in further detail below with reference to FIG. 11.

Figure 5:
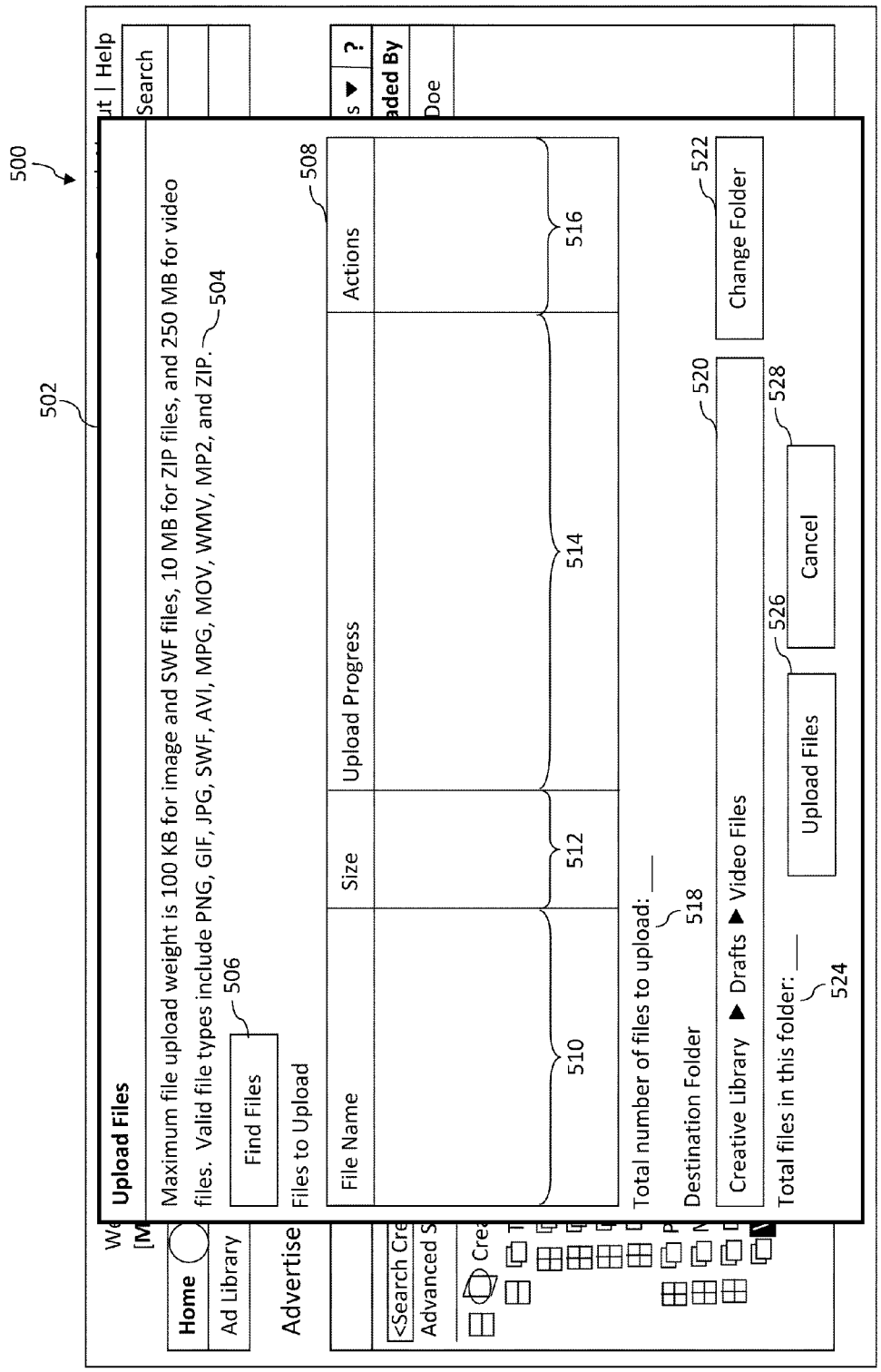
FIG. 5 is an illustration of an example Web page showing a graphical user interface that may be provided in response to a user selecting an Upload button shown in FIG. 4 in accordance with an embodiment described herein.

FIG. 5 is an illustration of an example Web page 500 showing a graphical user interface that may be provided in response to a user selecting Upload button 440 shown in FIG. 4 in accordance with an embodiment described herein. As shown in FIG. 5, the graphical user interface includes an upload window 502, which may be used by a user to upload creative assets to a computer system (e.g., ad serving system 114). Upload window 502 includes a textual message 504 that indicates the types of files that may be uploaded to the computer system and the maximum file weights corresponding to the respective file types. Textual message 504 indicates that PNG, GIF, JPG, SWF, AVI, MPG, MOV, WMV, MP2, and ZIP are valid file types. Textual message 504 specifies a maximum file weight of 100 KB for image and SWF files, 10 MB for ZIP files, and 250 MB for video files. The example file types and corresponding maximum file weights are provided for illustrative purposes and are not intended to be limiting. It will be recognized that any suitable file type may be specified as a valid file type and that any suitable file weight may be specified as a maximum file weight for any one or more of the valid file types.

Find Files button 506 enables a user to search a hierarchical folder structure for one or more creative assets to be uploaded to the computer system. For instance, the user may search any drives to which the user has access, such as a local hard drive, a floppy drive, a remotely located (e.g., networked) drive, etc. The functionality of Find Files button 506 is described in further detail below with reference to FIG. 6.

When the user finds creative asset(s) using Find Files button 506, those creative asset(s) are listed in window 508. When the name of a creative asset is listed in window 508, indicators associated with that creative asset are listed as well. As shown in FIG. 5, the name of each creative asset is listed in column 510. The size (e.g., file weight) for each creative asset is provided in column 512. The upload progress is provided in column 514. For instance, the upload progress may indicate that an upload operation has not yet begun with respect to the creative asset, a proportion of the upload operation that has been performed, that the upload operation is completed, that an error occurred during the upload operation, etc. Further discussion of upload progress is provided below with reference to FIG. 8. Selectable actions may be specified for each creative asset in column 516. For instance, the user may select a "Remove" button in column 516 to remove a corresponding creative asset from the list of creative assets provided in window 508. The "Remove" button is described in further detail below with reference to FIG. 8.

Textual message 518 specifies the number of files that are selected by the user via Find Files button 506 to be uploaded to the computer system. Destination folder window 520 shows the destination folder into which the creative assets selected by the user are to be stored. The destination folder may be changed by selecting Change Folder button 522 and navigating to the desired destination folder within a hierarchical folder structure. Textual message 524 specifies the total number of files in the destination folder. Upload Files button 526 enables the user to initiate uploading of the creative assets listed in window 508 to the computer system. Cancel button 528 enables the user to close upload window 502 and to return to Web page 400 shown in FIG. 4. Thus, if the user selects Cancel button 528, any creative assets listed in window 508 are not uploaded to the computer system. It should be noted, however, that the user is not prevented from selecting Upload button 440 of FIG. 4 again, in which case the user may upload any creative assets selected by the user to the computer system.

Figure 6:
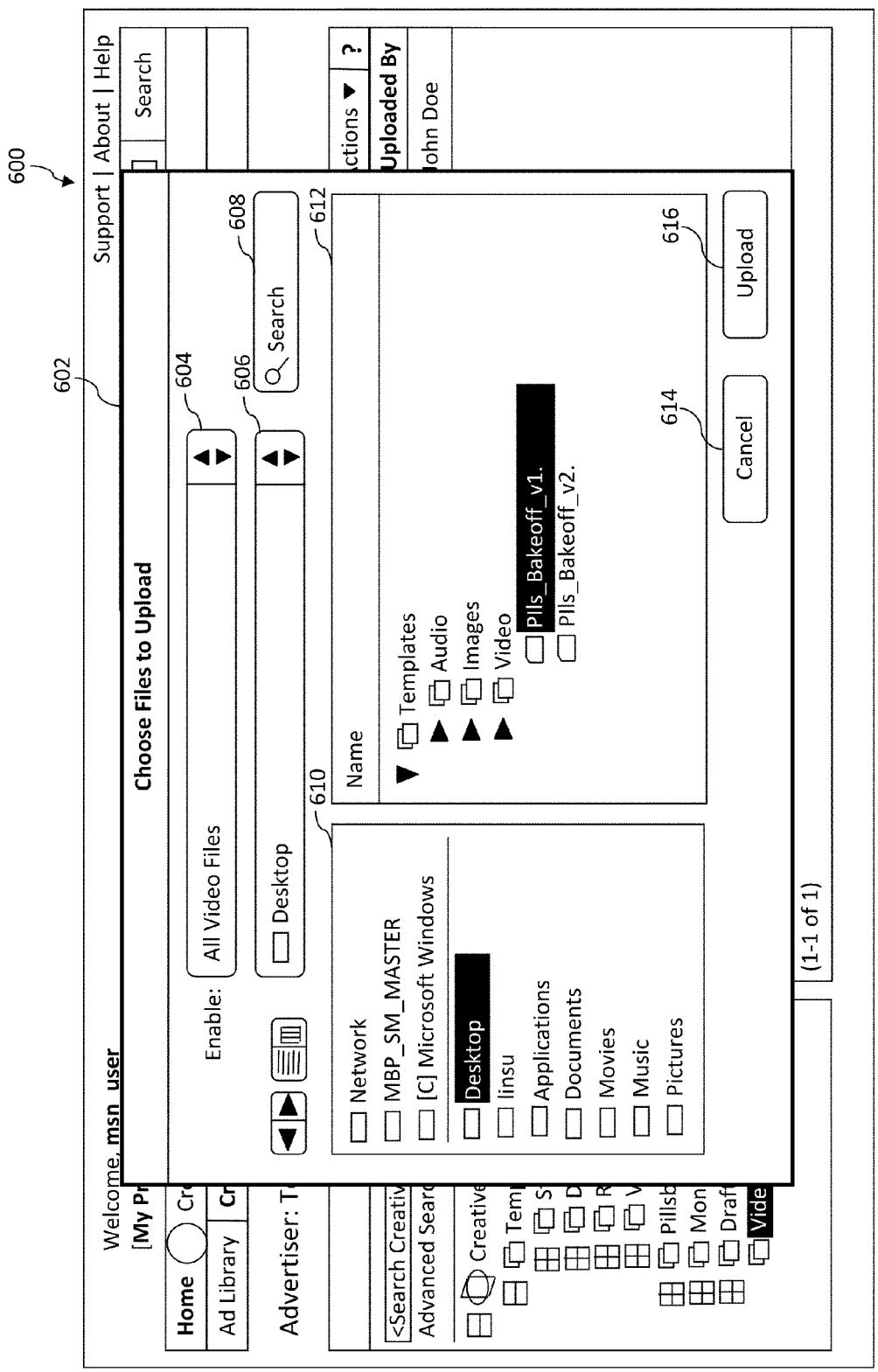
FIG. 6 is an illustration of an example Web page showing a graphical user interface that may be provided in response to a user selecting a Find Files button shown in FIG. 5 in accordance with an embodiment described herein.

FIG. 6 is an illustration of an example Web page 600 showing a graphical user interface that may be provided in response to a user selecting Find Files button 506 shown in FIG. 5 in accordance with an embodiment described herein. As shown in FIG. 6, the graphical user interface includes file selection window 602, which may be used by a user to select files (e.g., creative assets) to be uploaded to a computer system (e.g., ad serving system 114). Window 602 includes an enablement drop down menu 604, which enables the user to select one or more types of files that are to be considered for uploading to the computer system. As shown in FIG. 6, all video files are selected in enablement drop down menu 604 for illustrative purposes. Folder drop down menu 606 enables the user to select a folder to be searched for files having a file type corresponding with a file type selected in enablement drop down menu 604. When a folder is selected in folder drop down menu 606, that folder is highlighted in window 610. In FIG. 6, the Desktop folder is selected in folder drop down menu 606 for illustrative purposes. Accordingly, the Desktop folder is highlighted in window 610.

Search button 608 enables the user to initiate a search operation with respect to the folder that is selected in folder drop down menu 606. When the user selects Search button 608, files that are included in the folder selected in folder drop down menu 606 and that have a file type selected in enablement drop down menu 604 are listed in window 612. As shown in FIG. 6, the Desktop folder includes two video files, namely "Pils_Bakeoff_v1." and "Pils_Bakeoff_v2." The extensions for these files are validated once an upload operation is initiated with respect to the files. Accordingly, the extensions are not listed in window 612 for illustrative purposes.

The user may select any one or more files in window 612. Once such files are selected, the user may select Upload button 616 to upload the selected files to the computer system. Alternatively, the user may select Cancel button 614 to close file selection window 602 and to return to Web page 500 shown in FIG. 5. It should be noted, however, that the user is not prevented from selecting Find Files button 506 of FIG. 5 again, in which case the user may select any suitable files for uploading to the computer system. The user may return to Web page 600 any number of times, each time selecting any number of files to be uploaded to the computer system.

Figure 7:
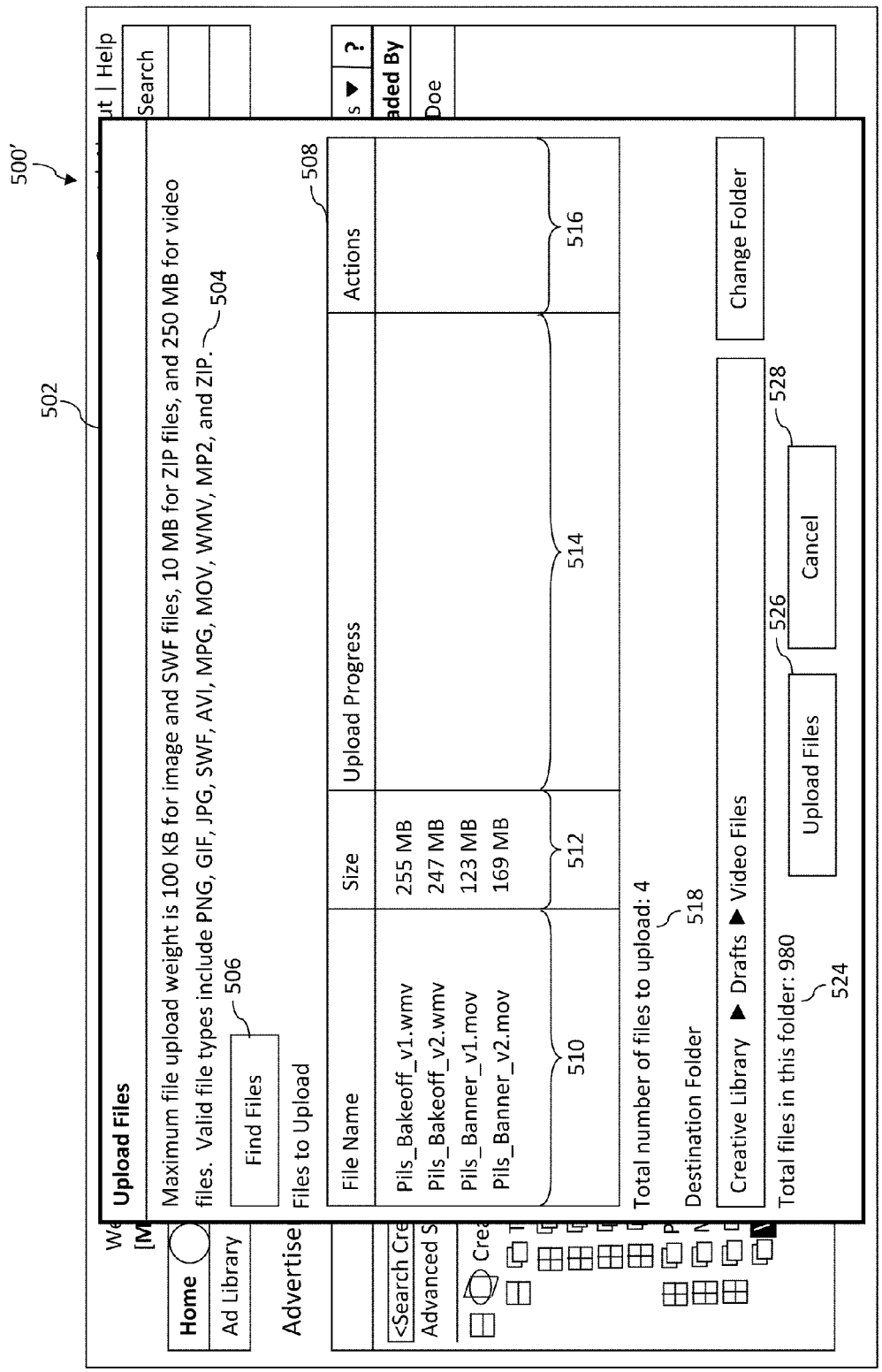
FIG. 7 is an illustration of an example Web page showing another implementation of the graphical user interface depicted in FIG. 5 in response to a user selecting an Upload button shown in FIG. 6 in accordance with an embodiment described herein.

FIG. 7 is an illustration of an example Web page 500' showing another implementation of the graphical user interface depicted in FIG. 5 in response to a user selecting Upload button 616 shown in FIG. 6 in accordance with an embodiment described herein. As shown in FIG. 7, the files that were selected using window 602 of FIG. 6 are listed in window 508 of the graphical user interface. Textual message 518 indicates that four files are selected to be uploaded to the computer system. The size of each file is provided in column 512. Textual message 524 indicates that 980 files are in the destination folder. The destination folder is shown to be the "Video Files" folder of hierarchical folder structure 410 of FIG. 4 for illustrative purposes.

Figure 8:
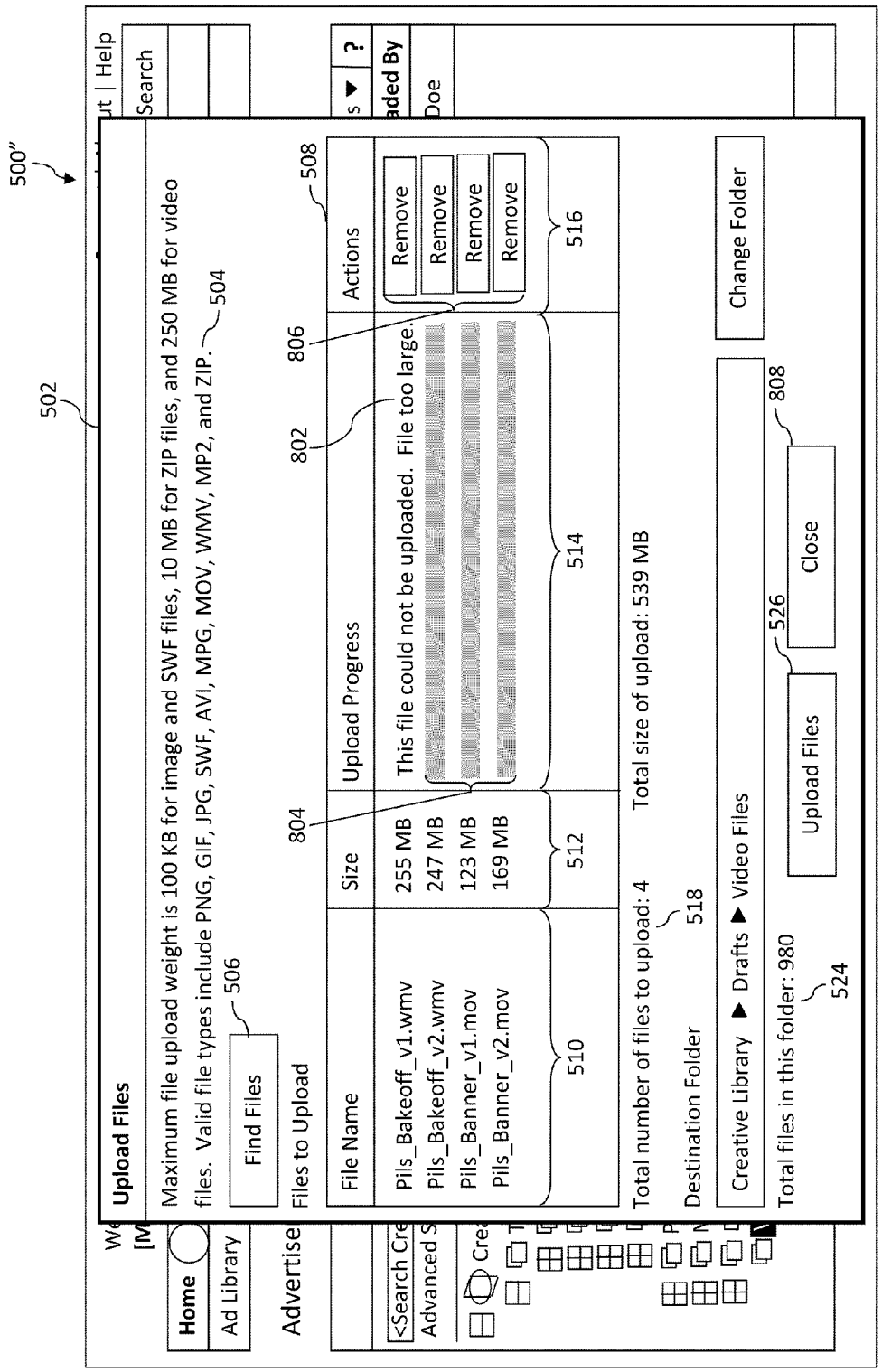
FIG. 8 is an illustration of an example Web page showing yet another implementation of the graphical user interface depicted in FIG. 5 in response to a user selecting an Upload Files button shown in FIG. 7 in accordance with an embodiment described herein.

FIG. 8 is an illustration of an example Web page 500" showing yet another implementation of the graphical user interface depicted in FIG. 5 in response to a user selecting Upload Files button 526 shown in FIG. 7 in accordance with an embodiment described herein. As shown in FIG. 8, textual message 802 indicates that the "Pils_Bakeoff_v1.wmv" file could not be uploaded because the file was too large. For instance, textual message 504 indicates that the maximum file weight for a video file is 250 MB. The size (e.g., file weight) of the "Pils_Bakeoff_v1.wmv" file is 255 MB. Thus, the size of the "Pils_Bakeoff_v1.wmv" file exceeds the maximum file size of 250 MB.

Each of the bars 804 shown in window 508 indicate the proportion of a respective file that has been uploaded to the computer system. As shown in FIG. 8, the "Pils_Bakeoff_v2.wmv", "Pils_Banner_v1.mov", and "Pils_Banner_v2.mov" files have been completely uploaded. The bars 804 corresponding to the respective files begin near the left edge of column 514 and extend toward the right edge of column 514 as the respective files are uploaded. For example, the upload progress of a file that is 50% uploaded is represented by a bar that extends approximately 50% toward the right edge of column 514 (i.e., approximately half-way across column 514). Remove buttons 806 are provided in column 516 to enable the user to remove the respective files from the computer system.

If all of the files listed in window 508 are successfully uploaded to the computer system, window 502 may automatically close. If any one or more of the files listed in window 502 are not successfully uploaded, however, window 502 may remain open and Cancel button 528 may change to Close button 808. When close button 808 replaces Cancel button 528, Close button 808 is enabled and other buttons in window 502 are disabled.

Figure 9:
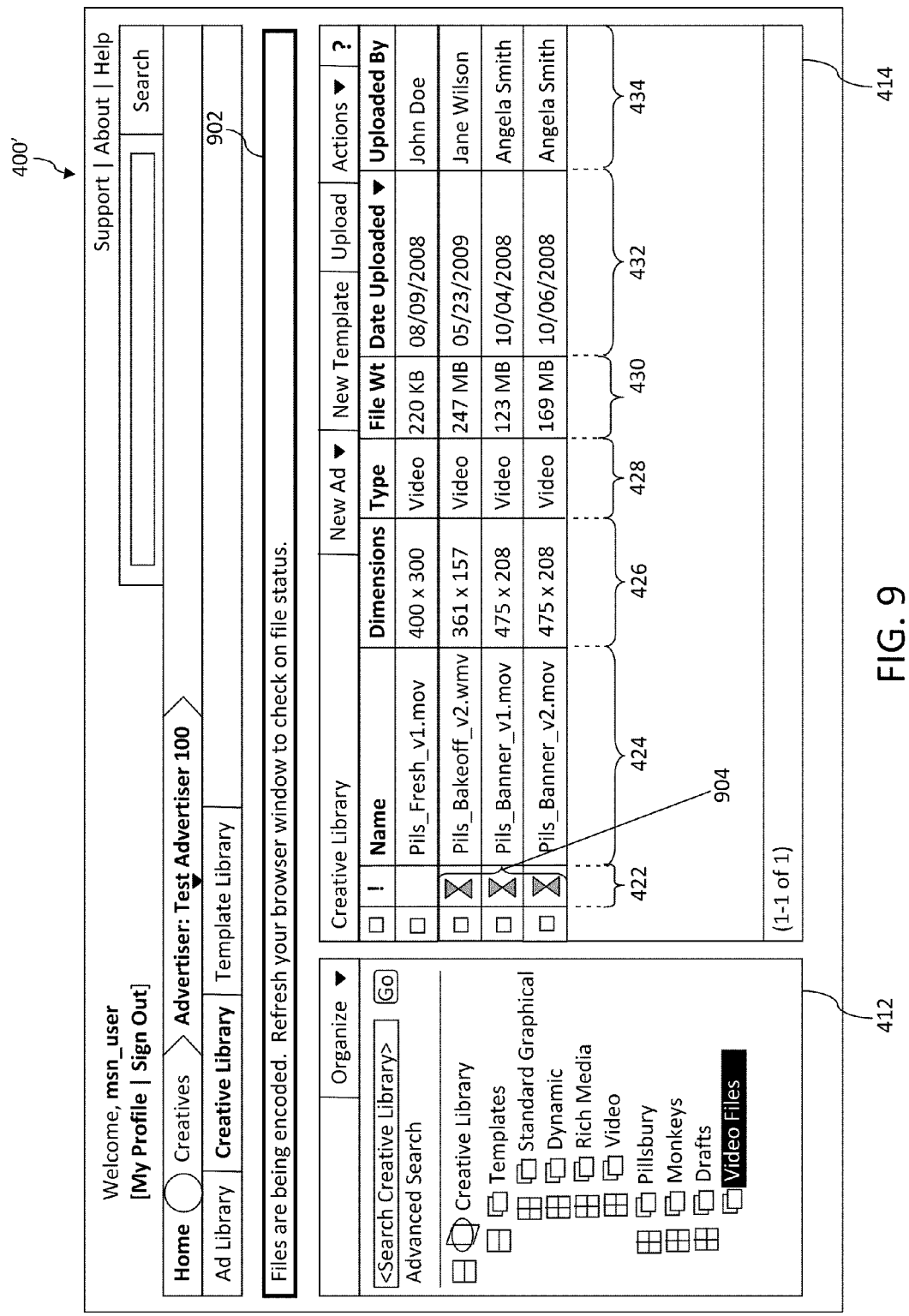
FIG. 9 is an illustration of an example Web page showing another implementation of the graphical user interface depicted in FIG. 4 in response to a user selecting a Close button shown in FIG. 8 in accordance with an embodiment described herein.

B. Example Web Pages for Indicating Unavailability of an Uploaded Video File that is being Bitrate Encoded Some example Web pages that may be used to indicate unavailability of an uploaded video file that is being bitrate encoded are discussed below with reference to FIGS. 9-11. FIG. 9 is an illustration of an example Web page 400' showing another implementation of the graphical user interface depicted in FIG. 4 in response to a user selecting Close button 808 shown in FIG. 8 in accordance with an embodiment described herein. As shown in FIG. 9, the "Pils_Bakeoff_v2.wmv", "Pils_Banner_v1.mov", and "Pils_Banner_v2.mov" files, which were successfully uploaded to the computer system using window 502 of FIG. 7, are added to the "Video Files" destination folder of Creative Library 404. The "Pils_Fresh_v1.mov" file was included in the "Video Files" folder before the "Pils_Bakeoff_v2.wmv", "Pils_Banner_v1.mov", and "Pils_Banner_v2.mov" files were uploaded to the computer system.

The files that were successfully uploaded to the computer system using window 502 of FIG. 7 (i.e., the "Pils_Bakeoff_v2.wmv", "Pils_Banner_v1.mov", and "Pils_Banner_v2.mov" files in this example) are encoded upon being successfully uploaded. Column 422 in window 414 includes first interface elements 904, which correspond to respective uploaded files that are being encoded. For instance, each of the "Pils_Bakeoff_v2.wmv", "Pils_Banner_v1.mov", and "Pils_Banner_v2.mov" files has a respective first interface element in column 422 of window 414 to indicate that the respective file is being encoded. The "Pils_Fresh_v1.mov" file does not have a respective first interface element because the "Pils_Fresh_v1.mov" file is not being encoded. For instance, the "Pils_Fresh_v1.mov" file may have been encoded when it was uploaded to the computer system.

First interface elements 904 are shown to be icons in FIG. 9 for illustrative purposes and are not intended to be limiting. It will be recognized that first interface elements 904 may be icons, textual messages, any other suitable elements that are capable of indicating that the respective files are being encoded, or a combination thereof.

The graphical user interface of FIG. 9 is shown to include textual message 902. Textual message 902 indicates that files are being encoded. Textual message 902 includes instructions that enable the user to determine whether the encoding is completed with respect to the uploaded files. The example instructions in textual message 902 state that the user may refresh the user's browser to check on the status of the encoding. For instance, when the user's browser is refreshed, a first interface element may be removed from column 422 if encoding is completed with respect to the file that corresponds to that first interface element.

Figure 10:
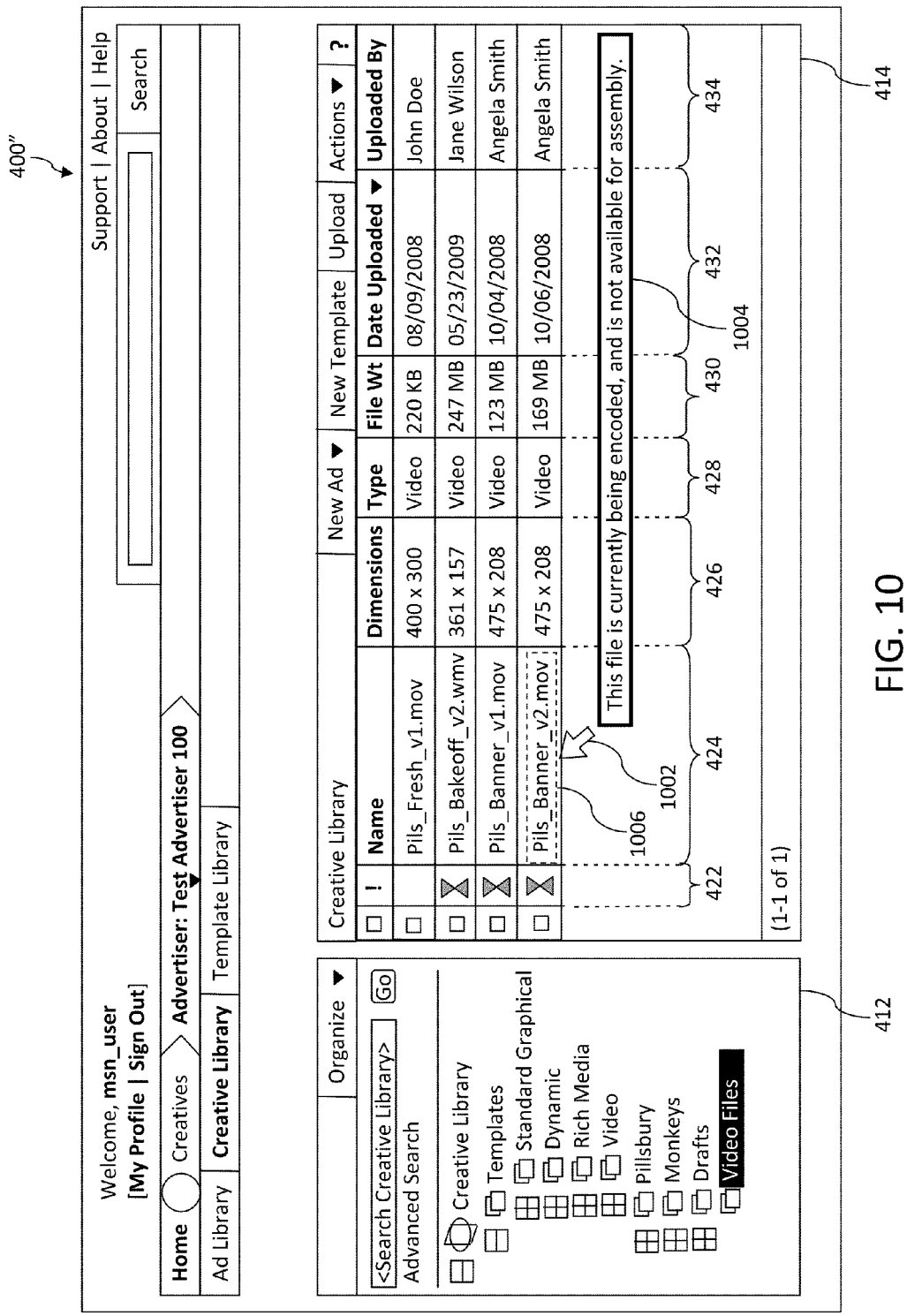
FIG. 10 is an illustration of an example Web page showing yet another implementation of the graphical user interface depicted in FIG. 4 in which a cursor is within a threshold proximity of a representation of an uploaded file that is being encoded in accordance with an embodiment described herein.

FIG. 10 is an illustration of an example Web page 400" showing yet another implementation of the graphical user interface depicted in FIG. 4 in which a cursor 1002 is within a threshold proximity of a representation of an uploaded file that is being encoded in accordance with an embodiment described herein. As shown in FIG. 10, a second interface element 1004 is provided in the graphical user interface in response to the cursor 1002 being within the threshold proximity of a representation 1006 of the "Pils_Banner_v2.mov" file. Second interface element 1004 indicates that the "Pils_Banner_v2.mov" file is being encoded. Second interface element 1004 further indicates that the "Pils_Banner_v2.mov" file is unavailable for inclusion in an online ad.

The representation 1006 of the "Pils_Banner_v2.mov" file is shown to be the name of the file for illustrative purposes and is not intended to be limiting. It will be recognized that a representation of an uploaded file may be any textual representation (e.g., a name and/or some other attribute of the uploaded file), graphical representation (e.g., an icon that represents the uploaded file), other type of representation, or any combination thereof. For example, the representation 1006 of the "Pils_Banner_v2.mov" file may include any one or more of the attributes corresponding to respective columns 424, 426, 428, 430, 432, and/or 434.

Second interface element 1004 is shown to be a textual message in FIG. 10 for illustrative purposes and is not intended to be limiting. It will be recognized that second interface element 1004 may be an icon, a textual message, any other suitable element, or a combination thereof.

Figure 11:
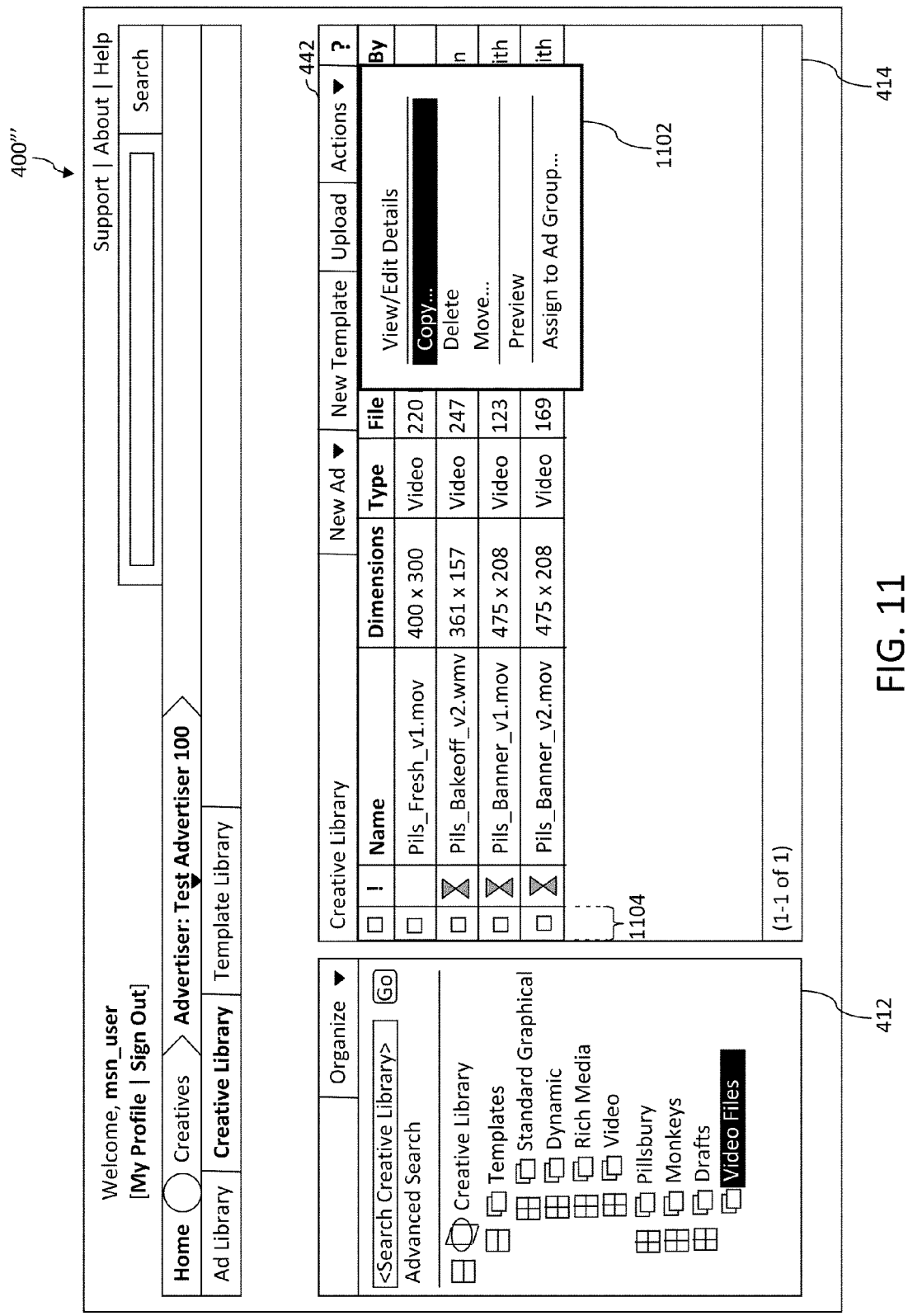
FIG. 11 is an illustration of an example Web page showing still another implementation of the graphical user interface depicted in FIG. 4 in which menu options are shown in accordance with an embodiment described herein.

FIG. 11 is an illustration of an example Web page 400''' showing still another implementation of the graphical user interface depicted in FIG. 4 in which menu options 1102 associated with Actions drop down menu 442 are shown in accordance with an embodiment described herein. As shown in FIG. 11, the user may select Actions drop down menu 442 to view menu operations 1002, which may be performed with respect to uploaded files that are listed in window 414. For instance, a user may initiate a menu operation with respect to an uploaded file by selecting the box in column 1104 that corresponds to the uploaded file and selecting the menu operation using Actions drop down menu 442.

As shown in FIG. 11, the user may view and/or edit details of an uploaded file, copy the uploaded file, delete the uploaded file, move the uploaded file, preview the uploaded file, assign the uploaded file to an ad group, etc. These example menu operations are provided for illustrative purposes and are not intended to be limiting. Persons skilled in the relevant art(s) will recognize that Actions drop down menu 442 may enable the user to perform any suitable menu operation(s) with respect to a selected uploaded file.

One or more of the menu operations 1102 may be disabled with respect to uploaded files that are being encoded. For example, the user may be denied the ability to view menu operations 1102 when the user attempts to select Actions drop down menu 1102 while an uploaded file listed in window 414 is being encoded. In another example, the user may be allowed to view menu operations 1102, but the user may be denied the ability to initiate a menu operation when the user attempts to select the menu operation. In yet another example, a box in column 1104 that corresponds to an uploaded file that is being encoded may be disabled, such that the uploaded file that is being encoded may not be selectable for processing with respect to a menu operation.

Figure 12:
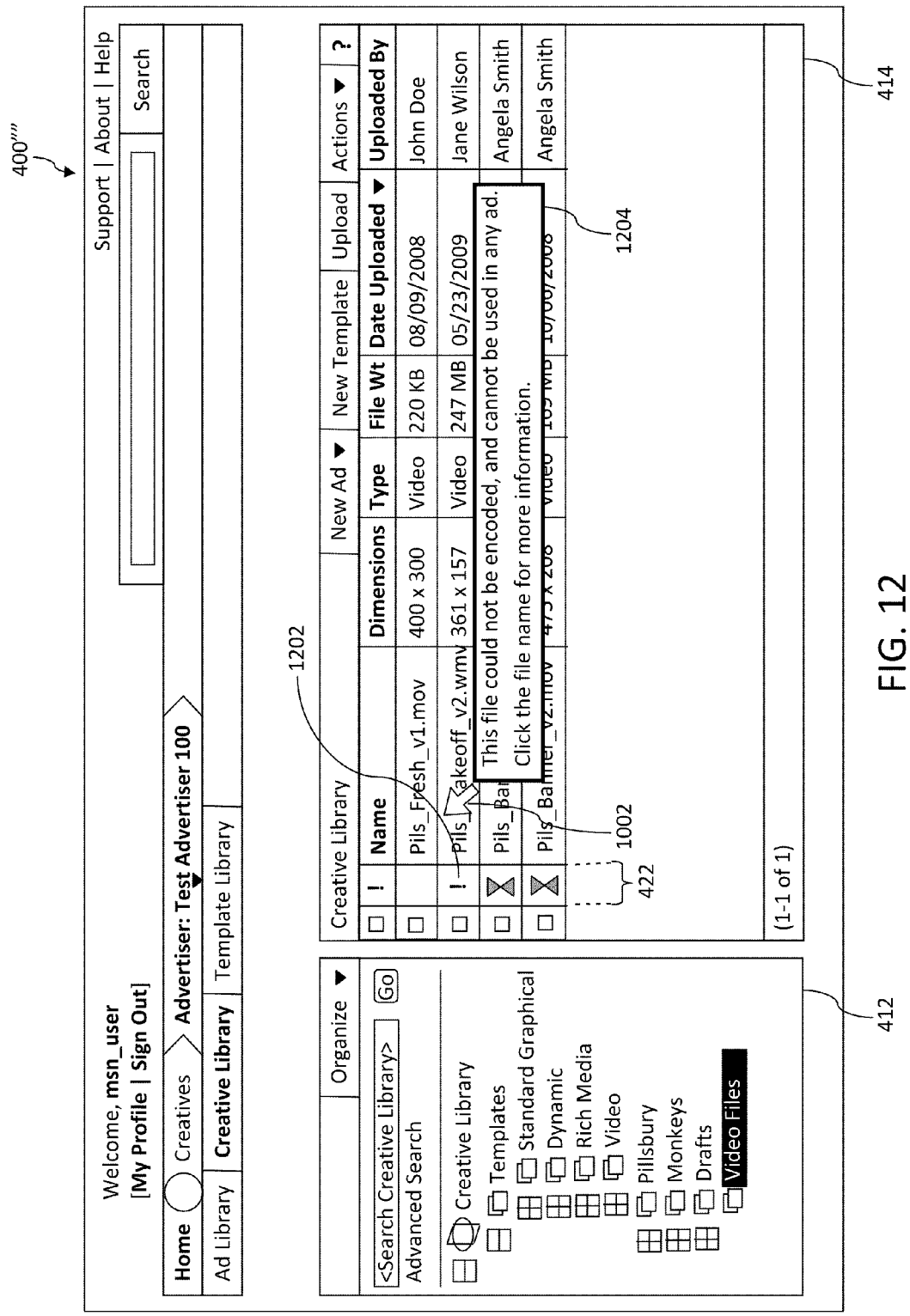
FIG. 12 is an illustration of an example Web page showing yet still another implementation of the graphical user interface depicted in FIG. 4 indicating that an error has occurred with respect to encoding of an uploaded file in accordance with an embodiment described herein.

C. Example Web Pages for Indicating the Result of Bitrate Encoding with Respect to an Uploaded Video File Some example Web pages that may be used to indicate the result of bitrate encoding with respect to an uploaded video file are discussed below with reference to FIGS. 12-14. FIG. 12 is an illustration of an example Web page 400"" showing yet still another implementation of the graphical user interface depicted in FIG. 4 indicating that an error has occurred with respect to encoding of an uploaded file in accordance with an embodiment described herein. As shown in FIG. 12, column 422 includes an error indicator 1202 that corresponds to the "Pils_Bakeoff_v2.wmv" file. Error indicator 1202 indicates that an error occurred with respect to encoding of the "Pils_Bakeoff_v2.wmv" file. Interface element 1204 is provided in response to cursor 1002 being within a threshold proximity of a representation of the "Pils_Bakeoff_v2.wmv" file. Interface element 1204 indicates that the "Pils_Bakeoff_v2.wmv" file could not be encoded. Interface element 1204 further indicates that the "Pils_Bakeoff_v2.wmv" file cannot be used in any online ad. Interface element 1204 also provides instructions that enable the user to obtain more information regarding the encoding error. For instance, interface element 1204 indicates that the user may click the name of the "Pils_Bakeoff_v2.wmv" file to obtain more information.

Interface element 1204 is shown to be a textual message in FIG. 12 for illustrative purposes and is not intended to be limiting. It will be recognized that interface element 1204 may be an icon, a textual message, any other suitable element, or a combination thereof.

Figure 13:
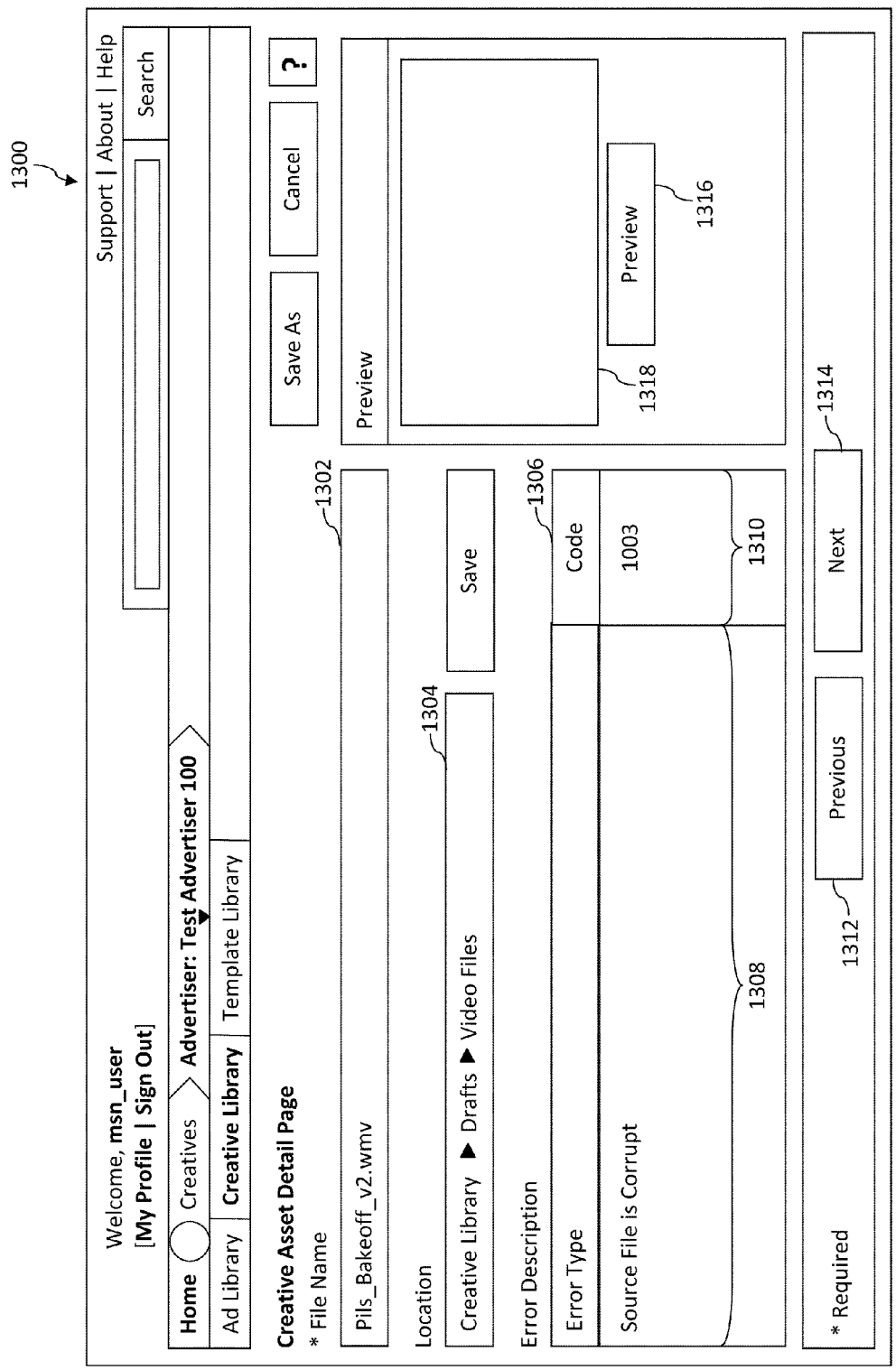
FIG. 13 is an illustration of an example Web page showing a graphical user interface for providing detailed information regarding an uploaded file in accordance with an embodiment described herein.

FIG. 13 is an illustration of an example Web page 1300 showing a graphical user interface for providing detailed information regarding an uploaded file in response to a user clicking on the file name of the uploaded file in window 414 of FIG. 12 in accordance with an embodiment described herein. In particular, detailed information regarding the "Pils_Bakeoff_v2.wmv" file is provided in FIG. 13 in response to the user clicking on the representation of the "Pils_Bakeoff_v2.wmv" file in window 414 of FIG. 12. File Name window 1302 shows the name of the "Pils_Bakeoff_v2.wmv" file. Location window 1304 shows a hierarchical list of folders in which the uploaded file is stored. As shown in FIG. 13, the "Pils_Bakeoff_v2.wmv" file is stored in the "Video Files" folder, which is stored in the "Drafts" folder, which is stored in the "Creative Library" root folder.

Error description window 1406 is provided for a file for which an error occurred during encoding of the file. Error description window 1406 includes an Error Type column 1308 and a Code column 1310. Error Type column provides an explanation of the error that occurred during encoding of the uploaded file. For instance, Error Type column 1308 indicates that the "Pils_Bakeoff_v2.wmv" source file is corrupt. Code column 1310 provides a code that corresponds to the error type specified in Error Type column 1308. The code that corresponds to a source file being corrupt is shown to be "1003". A table of some example error types and corresponding codes is provided below for illustrative purposes.

| Error Type | Code |
| --- | --- |
| Invalid XML | 1000 |
| Doc ID not found in the specified source system | 1001 |
| Source system credentials are invalid | 1002 |
| Source file is corrupt | 1003 |
| Source download failed | 1004 |

| Error Type | Code |
| --- | --- |
| Upload error: Unable to upload with the given credentials | 1005 |
| Invalid workflow name specified | 1006 |

These example error types and corresponding codes are not intended to be limiting. It will be recognized that any suitable error types and codes may be used.

Previous button 1312 enables the user to view detailed information regarding an uploaded file, which precedes the uploaded file specified in File Name window 1302 in window 414 of FIG. 12. For instance, if the user selects Previous button 1312, detailed information regarding the "Pils_Fresh_v1.mov" file is provided in the graphical user interface shown in FIG. 13 because the "Pils_Fresh_v1.mov" file precedes the "Pils_Bakeoff_v2.wmv" file in window 414 of FIG. 12. Next button 1314 enables the user to view detailed information regarding an uploaded file, which follows the uploaded file specified in File Name window 1302 in window 414 of FIG. 12. For instance, if the user selects Next button 1314, detailed information regarding the "Pils_Banner_v1.mov" file is provided in the graphical user interface shown in FIG. 13 because the "Pils_Banner_v1.mov" file follows the "Pils_Bakeoff_v2.wmv" file in window 414 of FIG. 12.

Preview button 1316 enables the user to view a preview of the file specified in File Name window 1302. Preview window 1318 provides the preview of the file specified in File Name window in response to the user selecting Preview button 1316. Preview button 1316 and Preview window 1318 may be disabled for any file for which an error occurred during encoding. As shown in FIG. 13, an error occurred during encoding of the "Pils_Bakeoff_v2.wmv" file. Accordingly, Preview button 1316 and Preview window 1318 may be disabled with respect to the "Pils_Bakeoff_v2.wmv" file.

Figure 14:
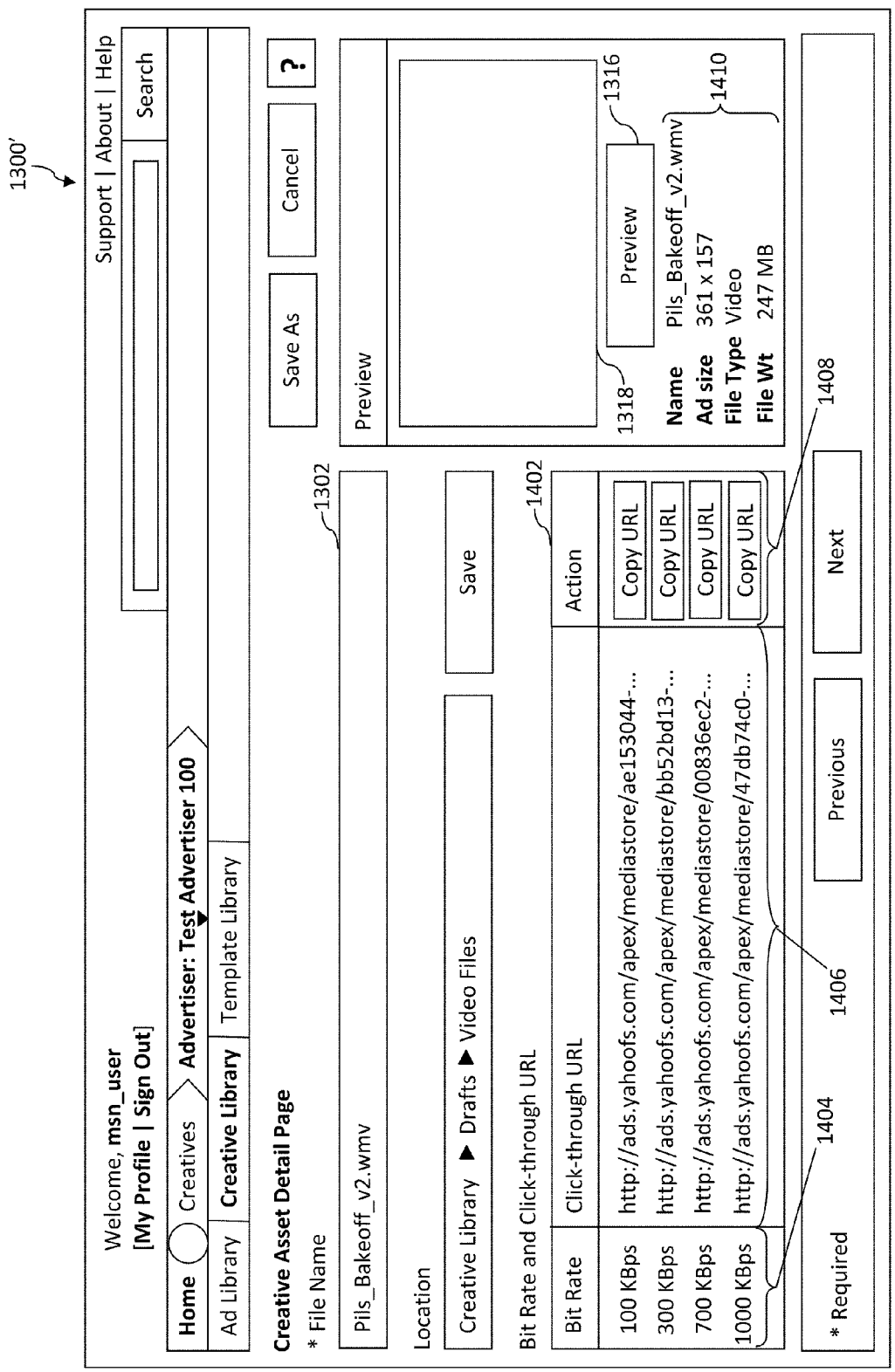
FIG. 14 is an illustration of an example Web page showing another implementation of the graphical user interface depicted in FIG. 13 in accordance with an embodiment described herein.

If the "Pils_Bakeoff_v2.wmv" file had not encountered an error during encoding, one or more encoded files would have been generated based on the "Pils_Bakeoff_v2.wmv" file. FIG. 14 is an illustration of an example Web page 1300' showing another implementation of the graphical user interface depicted in FIG. 13 in accordance with an embodiment described herein. For instance, the implementation of the graphical user interface shown in FIG. 14 may have been provided in response to the user clicking on the representation of the "Pils_Bakeoff_v2.wmv" file in window 414 of FIG. 12 if the "Pils_Bakeoff_v2.wmv" file had not encountered an error during encoding.

The graphical user interface shown in FIG. 14 includes an encoded file window 1402 that indicates a plurality of encoded files based on the "Pils—Bakeoff_v2.wmv" file. Encoded file window 1402 includes a Bit Rate column 1404, a Click-through URL column 1406, and an Action column 1408. Bit Rate column indicates bit rates that correspond to the respective encoded files. The bit rate of an encoded file indicates a bandwidth with which the encoded file is associated. For instance, the bit rate at which an encoded file can be transmitted to a user is based on the bandwidth that is available to the user with respect to the transmission of the encoded file. A relatively greater bandwidth corresponds to a relatively greater bit rate, and a relatively lower bandwidth corresponds to a relatively lower bit rate.

Click-through URL column 1406 indicates uniform resource locators (URLs) corresponding to the respective encoded files. For instance, a first encoded file corresponding to the 100 KBps bit rate may be accessed at the URL http://ads.yahoofs.com/apex/mediastore/ae 153044-aa84-4936-a9fe-32350a579eec; a second encoded file corresponding to the 300 KBps bit rate may be accessed at the URL http://ads.yahoofs.com/apex/mediastore/bb52bd13-899e-4932-9b6a-459ca2e2 cc86; a third encoded file corresponding to the 700 KBps bit rate may be accessed at the URL http://ads.yahoofs.com/apex/mediastore/00836ec2-ee5c-4315-ad67-0babed51b991; a fourth encoded file corresponding to the 1000 KBps bit rate may be accessed at the URL http://ads.yahoofs.com/apex/mediastore/47 db74c0-1773-4e23-bebe-ed6 cc8d4239e, and so on.

The example bit rates and URLs described above are provided for illustrative purposes and are not intended to be limiting. An uploaded file may be encoded in accordance with any suitable bit rate and may correspond to any suitable URL, uniform resource name (URN), or other identifier.

Action column 1408 includes Copy URL buttons that correspond to the respective encoded files. Each Copy URL button enables the user to copy the URL of the respective encoded file to the user's clipboard, so that the user may paste the URL into an online ad, for example. The Copy URL buttons may eliminate the need to highlight the URLs in column 1406 in an attempt to copy the URLs to the user's clipboard.

Information 1410 regarding the file specified in File Name window 1302 is provided in the graphical user interface. Information 1410 is shown to include the name of the file specified in File Name window 1302, the size of an ad in which the file may be included, the file type of the file specified in File Name window 1302, and the file weight of the file specified in File Name window 1302. This example information is provided for illustrative purposes and is not intended to be limiting. It will be recognized that information 1410 may include any suitable information regarding the file specified in File Name window 1302.

III. EXAMPLE COMPUTER IMPLEMENTATION

Figure 15:
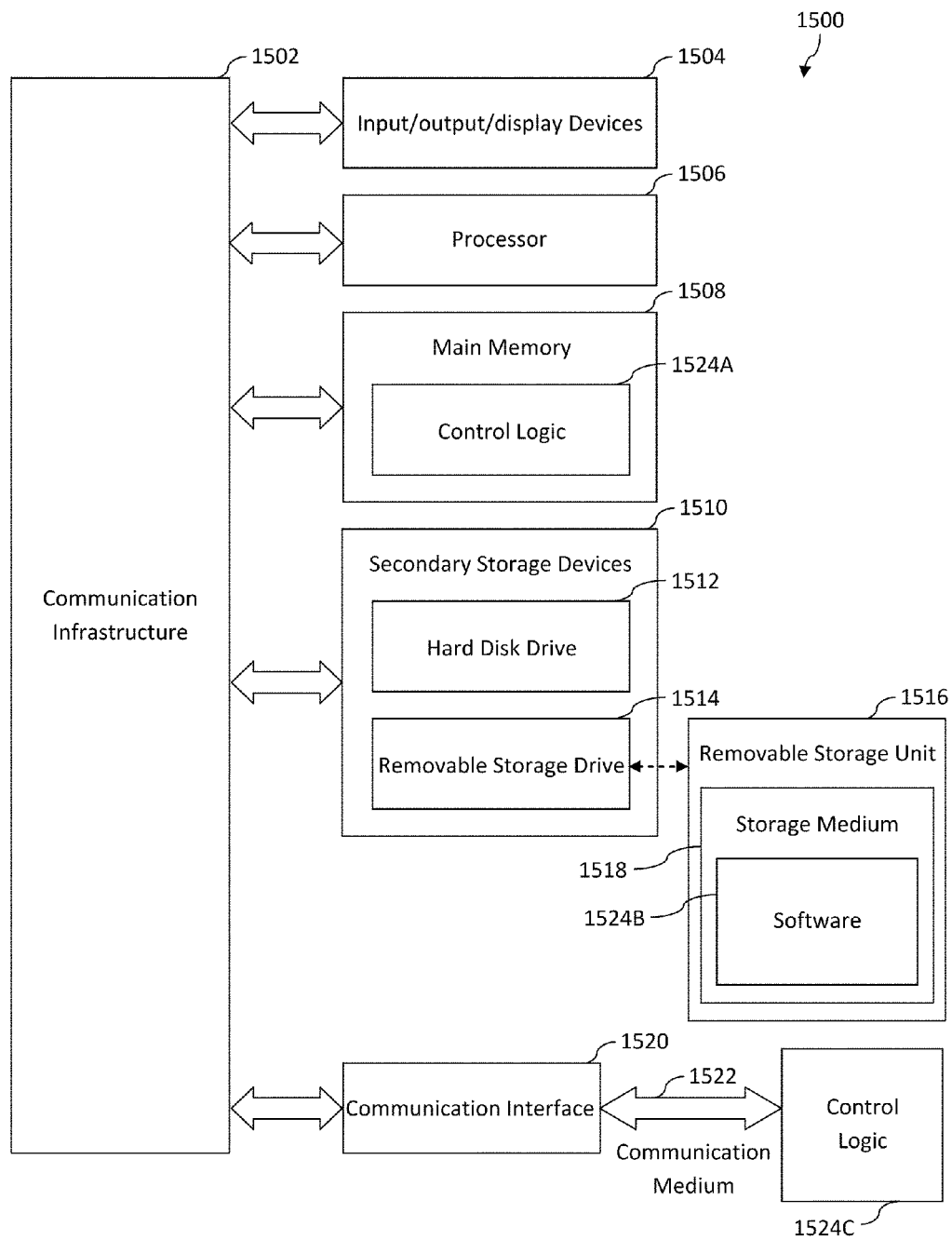
FIG. 15 is a block diagram of a computer in which embodiments may be implemented.

The embodiments described herein, including systems, methods/processes, and/or apparatuses, may be implemented using well known servers/computers, such as computer 1500 shown in FIG. 15. For example, elements of example online ad network 100, including advertiser system 102, ad serving system 104, creative asset processing system 106, any of the publisher Web servers 108A-108N, any of the user systems 110A-110M, and ad generation module 114 depicted in FIG. 1, and indication module 112 depicted in FIGS. 1 and 3, and each of the steps of flowchart 200 depicted in FIGS. 2A-2B, can each be implemented using one or more computers 1500.

Computer 1500 can be any commercially available and well known computer capable of performing the functions described herein, such as computers available from International Business Machines, Apple, Sun, HP, Dell, Cray, etc. Computer 1500 may be any type of computer, including a desktop computer, a server, etc.

As shown in FIG. 15, computer 1500 includes one or more processors (e.g., central processing units (CPUs)), such as processor 1506. Processor 1506 may include indication module 112 and/or ad generation module 114 of FIG. 1; receiving module 302, determination module 304, GUI module 306, disabling module 308, enabling module 310, interface element module 312, instruction module 314, and/or updating module 316 of FIG. 3; or any portion or combination thereof, for example, though the scope of the embodiments is not limited in this respect. Processor 1506 is connected to a communication infrastructure 1502, such as a communication bus. In some embodiments, processor 1506 can simultaneously operate multiple computing threads.

Computer 1500 also includes a primary or main memory 1508, such as a random access memory (RAM). Main memory has stored therein control logic 1524A (computer software), and data.

Computer 1500 also includes one or more secondary storage devices 1510. Secondary storage devices 1510 include, for example, a hard disk drive 1512 and/or a removable storage device or drive 1514, as well as other types of storage devices, such as memory cards and memory sticks. For instance, computer 1500 may include an industry standard interface, such as a universal serial bus (USB) interface for interfacing with devices such as a memory stick. Removable storage drive 1514 represents a floppy disk drive, a magnetic tape drive, a compact disk drive, an optical storage device, tape backup, etc.

Removable storage drive 1514 interacts with a removable storage unit 1516. Removable storage unit 1516 includes a computer useable or readable storage medium 1518 having stored therein computer software 1524B (control logic) and/or data. Removable storage unit 1516 represents a floppy disk, magnetic tape, compact disc (CD), digital versatile disc (DVD), Blue-ray disc, optical storage disk, memory stick, memory card, or any other computer data storage device. Removable storage drive 1514 reads from and/or writes to removable storage unit 1516 in a well known manner.

Computer 1500 also includes input/output/display devices 1504, such as monitors, keyboards, pointing devices, etc.

Computer 1500 further includes a communication or network interface 1520. Communication interface 1520 enables computer 1500 to communicate with remote devices. For example, communication interface 1520 allows computer 1500 to communicate over communication networks or mediums 1522 (representing a form of a computer useable or readable medium), such as local area networks (LANs), wide area networks (WANs), the Internet, etc. Network interface 1520 may interface with remote sites or networks via wired or wireless connections. Examples of communication interface 1522 include but are not limited to a modem, a network interface card (e.g., an Ethernet card), a communication port, a Personal Computer Memory Card International Association (PCMCIA) card, etc.

Control logic 1524C may be transmitted to and from computer 1500 via the communication medium 1522.

Any apparatus or manufacture comprising a computer useable or readable medium having control logic (software) stored therein is referred to herein as a computer program product or program storage device. This includes, but is not limited to, computer 1500, main memory 1508, secondary storage devices 1510, and removable storage unit 1516. Such computer program products, having control logic stored therein that, when executed by one or more data processing devices, cause such data processing devices to operate as described herein, represent embodiments of the invention.

For example, each of the elements of example online ad network 100, including ad serving system and its sub-elements (e.g., indication module 112 depicted in FIGS. 1 and 3 or any one or more sub-elements thereof), and each of the steps of flowchart 200 depicted in FIGS. 2A-2B can be implemented as control logic that may be stored on a computer useable medium or computer readable medium, which can be executed by one or more processors to operate as described herein.

The invention can be put into practice using software, hardware, and/or operating system implementations other than those described herein. Any software, hardware, and operating system implementations suitable for performing the functions described herein can be used.

IV. CONCLUSION

While various embodiments of the present invention have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A computer implemented method for indicating unavailability of an already uploaded video file comprising:
providing a graphical user interface for uploading a video file to a database for an online system, the graphical user interface including a first interface element capable of indicating that a video file is unavailable for processing except for bitrate encoding processing;
receiving an uploaded video file to the online system;
updating the first interface element to indicate that the uploaded video file is unavailable for processing except for bitrate encoding processing;
performing bitrate encoding processing on the uploaded video file to generate two or more encoded video files of the uploaded video file, each of the two or more encoded video file having a different bitrate;
updating, upon completion of the bitrate encoding processing, the first interface element to indicate that the uploaded video file is available for processing; and
providing, on the graphical user interface, a set of menu interface elements associated with each encoded video file from the two or more encoded video files, each set of menu interface elements allowing a user to access a set of menu options associated with one of the two or more encoded video files.

2. The computer implemented method for indicating unavailability of an already uploaded video file of claim 1, wherein the first interface element capable of indicating that a video file is unavailable for processing except for bitrate encoding processing comprises:
an icon indicating that the uploaded video file is unavailable for processing except for the bitrate encoding processing.

3. The computer implemented method for indicating unavailability of an already uploaded video file of claim 1, the first interface element capable of indicating that a video file is unavailable for processing except for bitrate encoding processing comprises:
instructions in the graphical user interface that enable a user to determine whether the bitrate encoding processing is completed with respect to the uploaded video file.

4. The computer implemented method for indicating unavailability of an already uploaded video file of claim 1, further comprising:
receiving a second indicator that specifies that a cursor is within a threshold proximity of a representation of the uploaded video file that is included in the graphical user interface; and
providing a second interface element associated with the uploaded video file in the graphical user interface in response to receiving the second indicator, the second interface element indicating that the uploaded video file is unavailable for processing except for the bitrate encoding processing.

5. The computer implemented method for indicating unavailability of an already uploaded video file of claim 4, wherein providing the second interface element comprises:
providing a textual message that indicates that the bitrate encoding processing is being performed with respect to the uploaded video file.

6. The computer implemented method for indicating unavailability of an already uploaded video file of claim 1, further comprising:
receiving a second indicator that specifies completion of the bitrate encoding processing with respect to the uploaded video file; and
automatically updating the first interface element to indicate that the uploaded video file is available for processing in response to receiving the second indicator.

7. The computer implemented method for indicating unavailability of an already uploaded video file of claim 1, further comprising:
disabling one or more menu options from the set of menu options associated with one of the two or more encoded video files in response to receiving the first indicator.

8. The computer implemented method for indicating unavailability of an already uploaded video file of claim 7, further comprising:
receiving a second indicator that specifies completion of the bitrate encoding processing with respect to the uploaded video file;
automatically updating the first interface element to indicate that the uploaded video file is available for processing in response to receiving the second indicator; and
automatically enabling the one or more menu options associated with one of the two or more encoded video files in response to receiving the second indicator.

9. The computer implemented method for indicating unavailability of an already uploaded video file of claim 1, wherein each of the set of menu options contains a preview option allowing the user to preview the respective encoded video file at its bitrate.

10. The computer implemented method for indicating unavailability of an already uploaded video file of claim 1, wherein each of the set of menu options contains an assign option allowing a user to assign the respective encoded video file to an ad group.

11. A system for indicating the unavailability of an already uploaded video file comprising:
a receiving module for receiving a first indicator with respect to an already uploaded video file, the first indicator indicating performing bitrate encoding processing with respect to the already uploaded video file, wherein the bitrate processing generates two or more encoded video files from the already uploaded video file, each of the two or more video files having distinct corresponding bitrates;
a determination module configured to determine that bitrate encoding processing is being performed with respect to the already uploaded video file;
a GUI module, implemented using at least one processor, configured to provide a graphical user interface that includes a first interface element associated with the already uploaded video file, the first interface element indicating that the already uploaded video file is unavailable for processing except for the bitrate encoding processing in response to determination that the bitrate encoding processing is being performed with respect to the already uploaded video file, wherein the GUI module is further configured to provide a set of menu options associated with each of the two or more encoded video files.

12. The system for indicating the unavailability of an already uploaded video file of claim 11, wherein the first interface element is an icon.

13. The system for indicating the unavailability of an already uploaded video file of claim 11, wherein the first interface element is a textual message.

14. The system for indicating the unavailability of an already uploaded video file of claim 11, wherein the graphical user interface includes instructions for enabling a user to determine whether the bitrate encoding processing is completed with respect to the uploaded video file.

15. The system for indicating the unavailability of an already uploaded video file of claim 11, wherein the determination module is further configured to determine that a cursor is within a threshold proximity of a representation of the uploaded video file that is included in the graphical user interface; and
wherein the GUI module is further configured to provide a second interface element associated with the uploaded video file in the graphical user interface in response to determination that the cursor is within the threshold proximity, the second interface element indicating that the uploaded video file is unavailable for processing except for the bitrate encoding processing.

16. The system for indicating the unavailability of an already uploaded video file of claim 11, wherein the determination module is further configured to determine that the bitrate encoding processing is completed with respect to the uploaded video file; and
wherein the GUI module is further configured to automatically update the first interface element to indicate that the uploaded video file is available for processing in response to determination that the bitrate encoding processing is completed with respect to the uploaded video file.

17. The system for indicating the unavailability of an already uploaded video file of claim 11, wherein the determination module is further configured to determine whether the bitrate encoding processing is completed with respect to an uploaded video file;
the system further comprising:
a disabling module configured to disable one or more menu options from the sets of menu options associated with the two or more encoded video files from the uploaded video file in response to determination that the bitrate encoding processing is being performed with respect to the uploaded video file, and
an enabling module configured to automatically enable the one or more menu options from the sets of menu options associated with the two or more encoded video files from the uploaded video file in response to determination that the bitrate encoding processing is completed with respect to the uploaded video file.

18. A computer program product comprising a non-transitory computer-readable memory having computer program logic recorded thereon for enabling a processor based system to indicate unavailability of an already uploaded video file that is being bitrate encoded, comprising:
a first program logic module for allowing the processor-based system to access an already uploaded video file on an online system;
a second program logic module for enabling the processor-based system to determine that bitrate encoding processing is being performed with respect to an uploaded video file, the bitrate processing generating two or more encoded video files from the uploaded video file, each of the two or more encoded video files having a corresponding bitrate; and a third program logic module for enabling the processor-based system to provide a graphical user interface that includes a first interface element associated with the uploaded video file, the first interface element indicating that the uploaded video file is unavailable for processing except for the bitrate encoding processing in response to determination that the bitrate encoding processing is being performed with respect to the uploaded video file, wherein the graphical user interface further includes a set of menu options associated with each of the two or more encoded video files.

19. The computer program product of claim 18, further comprising:

a fourth program logic module for enabling the processor-based system to determine that the bitrate encoding processing is completed with respect to the uploaded video file; and a fifth program logic module for enabling the processor-based system to automatically update the first interface element to indicate that the uploaded video file is available for processing in response to determination that the bitrate encoding processing is completed with respect to the uploaded video file.

20. The computer program product of claim 19, further comprising:

a sixth program logic module for enabling the processor-based system to disable one or more menu options from the set of menu options associated with the encoded video files in response to determination that the bitrate encoding processing is being performed with respect to the uploaded video file, and a seventh program logic module for enabling the processor-based system to automatically enable the one or more menu options associated with the encoded video files in response to determination that the bitrate encoding processing is completed with respect to the uploaded video file.

* * * * *